United States Patent [19]
Okouchi

[11] Patent Number: 5,508,713
[45] Date of Patent: Apr. 16, 1996

[54] CONTROL SYSTEM FOR PICTURE DISPLAY APPARATUS HAVING IMPROVED DISPLAYING DATA TRANSMISSION SYSTEM

[75] Inventor: Fusakichi Okouchi, Atsugi, Japan

[73] Assignee: Ricoh Company, Ltd., Tokyo, Japan

[21] Appl. No.: 408,107

[22] Filed: Mar. 21, 1995

Related U.S. Application Data

[63] Continuation of Ser. No. 75,877, Jun. 14, 1993, abandoned.

[30] Foreign Application Priority Data

Jun. 19, 1992 [JP] Japan .................................. 4-184798

[51] Int. Cl.⁶ .................................................. G09G 5/00
[52] U.S. Cl. .................................. 345/1; 345/2; 379/58
[58] Field of Search ............................ 345/1, 2; 348/15, 348/16, 17, 18, 19; 379/58, 59, 96, 428

[56] References Cited

U.S. PATENT DOCUMENTS

| | | | |
|---|---|---|---|
| 4,653,086 | 3/1987 | Laube | 379/96 |
| 4,827,085 | 5/1989 | Yaniv et al. | 178/18 |
| 4,888,795 | 12/1989 | Ando et al. | 348/19 |
| 4,891,702 | 1/1990 | Nakayama et al. | 358/140 |
| 5,105,183 | 4/1992 | Beckman | 345/1 |
| 5,117,225 | 5/1992 | Wang | 345/2 |
| 5,127,050 | 6/1992 | Takahashi et al. | 379/428 |
| 5,128,981 | 7/1992 | Tsukamoto et al. | 379/58 |

*Primary Examiner*—Ulysses Weldon
*Assistant Examiner*—Matthew Luu
*Attorney, Agent, or Firm*—Oblon, Spivak, McClelland, Maier, & Neustadt

[57] ABSTRACT

A first picture-display apparatus comprising: a first display device having a screen for and displaying pictures on the screen so that the screen is refreshed at frequent predetermined screen refreshing intervals; a first display-device control device for outputting the displaying data to the first display device at the frequent predetermined screen refreshing intervals; a storing device for storing the displaying data; a displaying-data control device for reading the displaying data stored in the storing device at frequent predetermined screen renewal intervals, the displaying-data control device then outputting the read displaying data to the first display-device control device. The first picture-display apparatus outputs the displaying data to at least one second picture-display apparatus at the frequent predetermined screen renewal intervals.

13 Claims, 33 Drawing Sheets

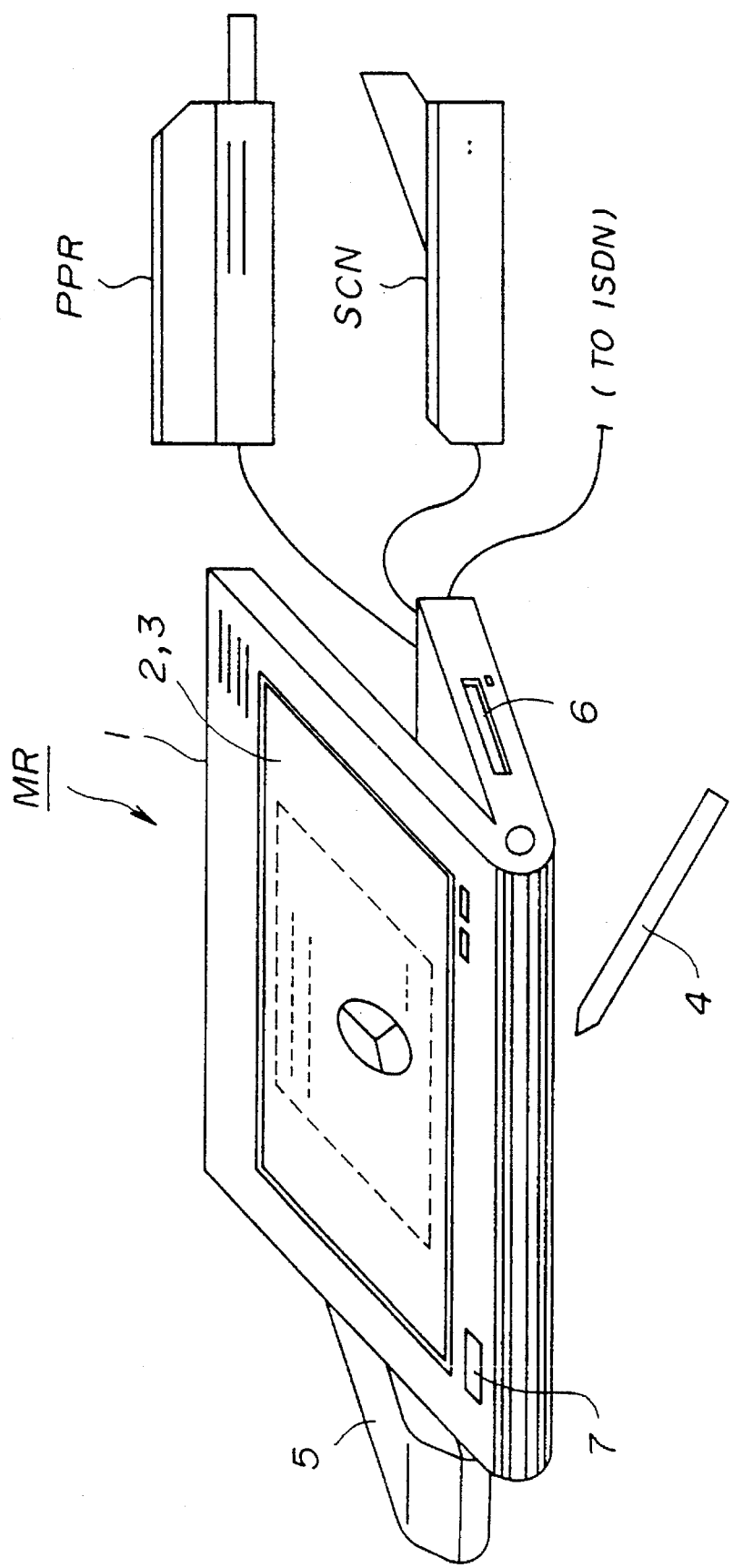

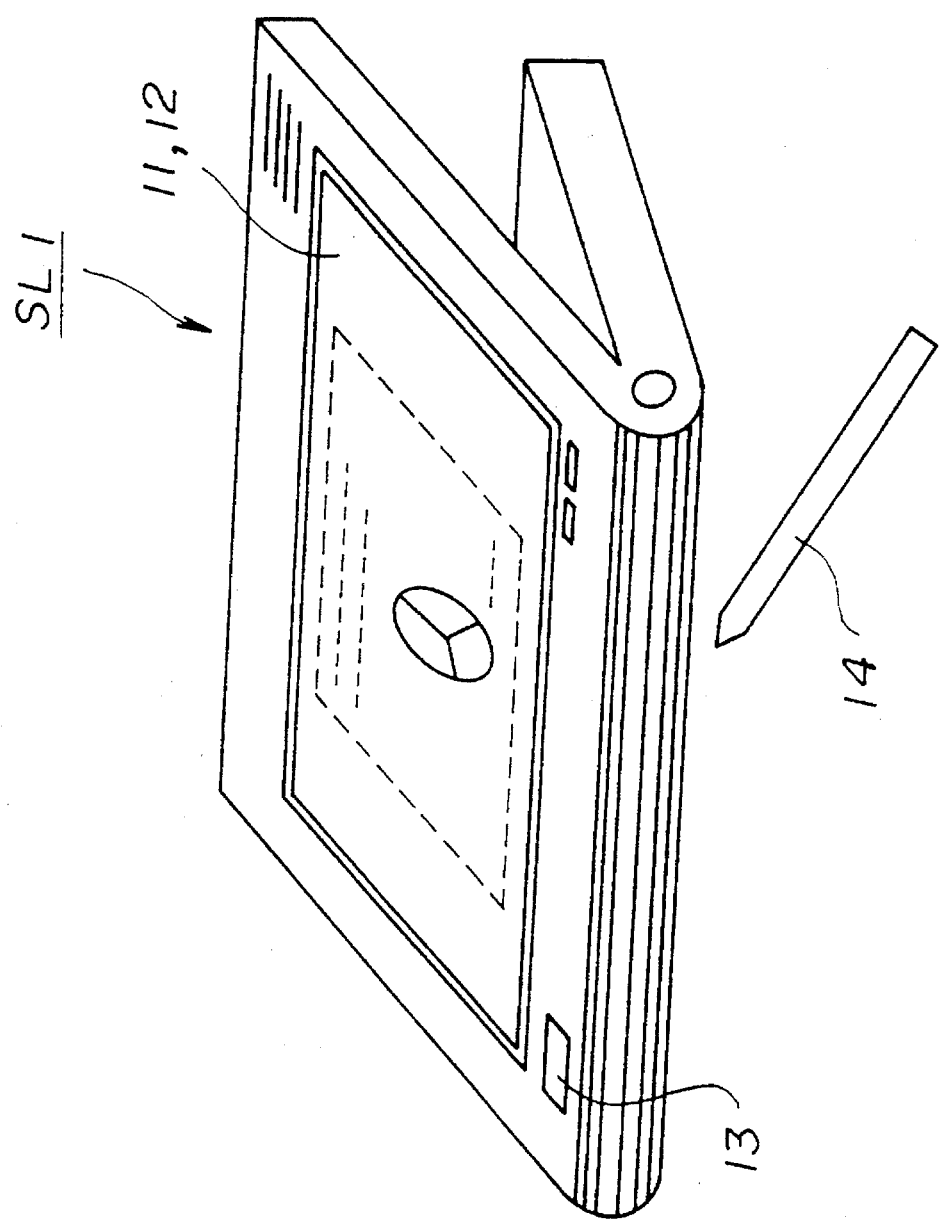

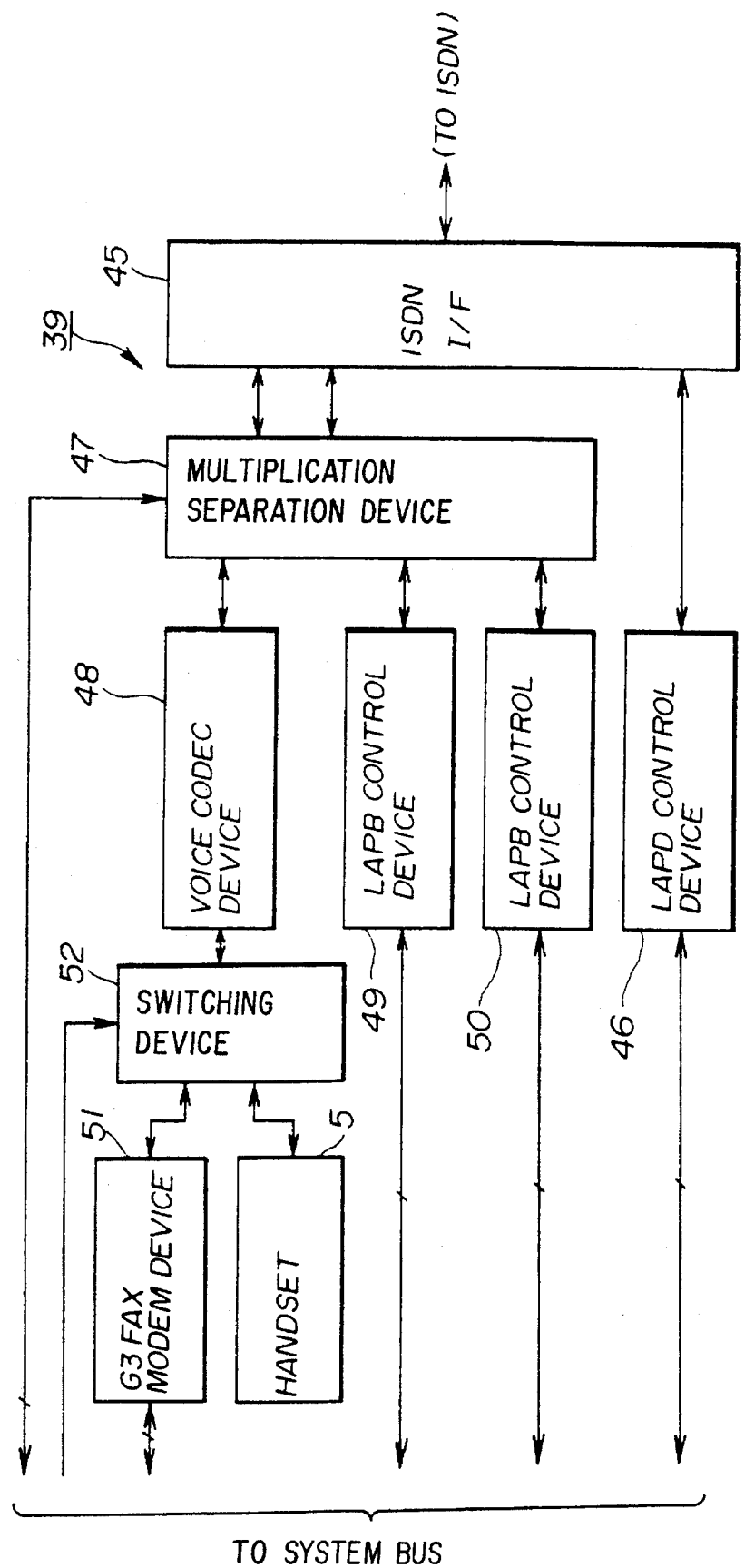

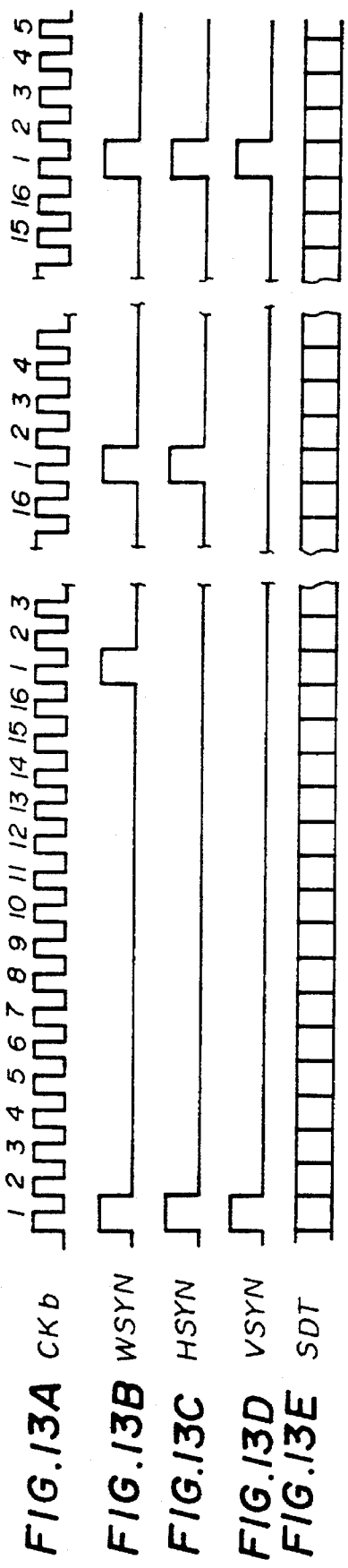

FIG.19B

| TRANSMISSION ABILITY | MASTER NUMBER | SLAVE NUMBER | SUBORDINATE LAYER MATCHING PROPERTY | HIGHER LAYER MATCHING PROPERTY | USER-USER |
|---|---|---|---|---|---|

FIG.19A

| PROTOCOL IDENTIFIER | CALL NUMBER | MESSAGE TYPE | MANDATORY INFORMATION ELEMENT | ADDITIONAL INFORMATION ELEMENT |
|---|---|---|---|---|

FIG.23

| | | | | (OCTET) | | | | |
|---|---|---|---|---|---|---|---|---|
| | 1 | 2 | 3 | 4 | 5 | 6 | 7 | 8 |
| 0 | N1 | 0 | 0 | 1 | 1 | 0 | 1 | 1 |
| 1 | 0 | 1 | A | E | C1 | C2 | C3 | C4 |
| 2 | N2 | 0 | 0 | 1 | 1 | 0 | 1 | 1 |
| 3 | 0 | 1 | A | E | C1 | C2 | C3 | C4 |
| 4 | N3 | 0 | 0 | 1 | 1 | 0 | 1 | 1 |
| 5 | 1 | 1 | A | E | C1 | C2 | C3 | C4 |
| 6 | N4 | 0 | 0 | 1 | 1 | 0 | 1 | 1 |
| 7 | 0 | 1 | A | E | C1 | C2 | C3 | C4 |
| 8 | N5 | 0 | 0 | 1 | 1 | 0 | 1 | 1 |
| 9 | 1 | 1 | A | E | C1 | C2 | C3 | C4 |
| 10 | L1 | 0 | 0 | 1 | 1 | 0 | 1 | 1 |
| 11 | 1 | 1 | A | E | C1 | C2 | C3 | C4 |
| 12 | L2 | 0 | 0 | 1 | 1 | 0 | 1 | 1 |
| 13 | L3 | 1 | A | E | C1 | C2 | C3 | C4 |
| 14 | TEA | 0 | 0 | 1 | 1 | 0 | 1 | 1 |
| 15 | R | 1 | A | E | C1 | C2 | C3 | C4 |

(FRAME)

CONTROL SYSTEM FOR PICTURE DISPLAY APPARATUS HAVING IMPROVED DISPLAYING DATA TRANSMISSION SYSTEM

This application is a Continuation of application Ser. No. 08/075,877, filed on Jun. 14, 1993, now abandoned.

BACKGROUND OF THE INVENTION

The present invention relates to a control system for a picture-display apparatus employing display devices such as, for example, liquid crystal display devices having a high display resolution rate.

Recently, a still picture conference apparatus (communication conference apparatus) has been proposed, which apparatus enables the holding of a tele-conference utilizing documents therein. Holding of such a tele-conference utilizing documents can not be enabled by a simple tele-conference apparatus. Instead, a complex apparatus, such as that of the conventional art, is needed. Such a complex still picture conference apparatus employs, in addition to a picture displaying function, the following functions for executing a tele-conference: a speech function, a facsimile function for transmission and/or receiving data of documents to be utilized in the conference, a tele-writing communication function for drawing pictures on a still picture displaying a document used in the conference, a still picture conference function for enabling the conference to proceed, and a document storing function for storing documents utilized in the conference. Such a still picture conference apparatus enables the holding of a conference in which documents to be utilized in the conference are transmitted and/or received as necessary, the transmission and/or receiving being executed among terminals used by respective members participating in the conference. Thus, in addition to utilizing the speech function or the tele-writing communication function, the members may refer to the transmitted and/or received documents in the conference.

A problem may occur in such a tele-conference using such a still picture conference apparatus in a case where a plurality of members (persons) in a common location (first location) participate in a conference which is held, for example, between the first location and another location (second location). In this case, the plurality of members in the first location commonly may use one terminal of the still picture conference apparatus in the conference, the plurality of members in the first location, for example, being present in a common room. Thus, the plurality of members in the first location have to be positioned to surround the terminal of the apparatus. Thus, some of the plurality of members in the first location can read contents of a picture displayed on the screen accompanying the terminal, because these members can hook at the front side of the screen. On the other hand, the remaining members in the first location can not read the displayed contents of the picture because they can not stand in front of the screen.

The above problem may be eliminated by providing a respective terminal with such a still picture conference apparatus for each member. Each member may the operate their own terminal independently from operations executed by the other members.

However, provision of such a plurality of terminals for such a still picture conference apparatus for one location as mentioned above may result in the cost of the conference becoming high. Further, such provision of a plurality of terminals for the still picture conference apparatus necessitates that a MCU (multi locations connection unit) function for connecting a plurality of still picture conference apparatus located in one location be provided, even when the conference is held between just two different locations. However provision of the MCU function may result in the cost of the conference becoming high.

To eliminate the above problem, the following method has been proposed. A plurality of picture displaying apparatus may be provided, each of the plurality of picture displaying apparatus having, from among the functions employed by the above mentioned still picture conference apparatus, only the picture displaying function. That is, each of the plurality of picture displaying apparatus does not employ the functions of the still picture conference apparatus other than the picture displaying function, such other functions including, for example, the facsimile function. One of the above picture displaying apparatus is given to each of the members (persons) present in a common room of a common location. Each of the given (slave) picture displaying apparatus displays the contents of a picture distributed from a master still picture conference apparatus provided for each location. Thus, the members who have been respectively given one of the slave picture displaying apparatus can see therewith the identical contents of the picture simultaneously, the identical contents of the picture being distributed from the master static conference apparatus.

However, use of a method such as one in which identical contents of a picture are distributed to each slave picture display apparatus as mentioned above results in the following problems.

A first problem is that the sizes of both such a master still picture conference apparatus and such a slave picture displaying apparatus become large. This problem occurs in a case where both the master still picture conference apparatus and the slave picture displaying apparatus employ a CRT (cathode ray tube) device as means for displaying the contents of a picture distributed from the master still picture conference apparatus to the slave picture displaying apparatus. This distribution of the displaying contents of a picture may be executed by obtaining a display signal (for example, an NTSC (National Television System Committee) composite signal) which is provided to a CRT device in the master still picture conference apparatus so that the displaying contents of a picture can be displayed. The obtained display signal is then distributed to the slave picture displaying apparatus, the distribution being executed by using a coaxial cable. Such constructions of the master still picture conference apparatus and the slave picture displaying apparatus result in the sizes thereof becoming large, as mentioned above. Thus, a large conference room will be required for such a large apparatus.

A second problem is the high cost of a signal transmission system for distributing of the displaying contents of a picture from the master still picture conference apparatus to the slave picture displaying apparatus. The reason why this system is expensive will now be explained. A picture displaying function, which will be described below, is preferably provided (by such a master still picture conference apparatus) for such a conference as using the master still picture conference apparatus. The CRT device in the master still picture conference apparatus may display a fine A4 size picture on the screen (a resolution rate of the displayed contents of a picture being high) comprising, for example, 1024 lines, each line comprising 1280 pixels. A displaying signal transferred with a very fast clock signal is needed so that such a high-resolution-rate of the displayed contents of a picture can be distributed from the master still picture conference apparatus to the slave picture displaying apparatus, the distribution being executed by using the displaying signal. Such a system employing such a displaying signal transferred with a very fast clock signal results in the cost of the signal transmission system becoming high.

If neither the master still picture conference apparatus nor the slave picture displaying apparatus employs a CRT device but instead employ a liquid crystal display device as means for displaying the contents of a picture, the above first problem may be eliminated and thus the sizes of these apparatus may be relatively small. However, even if the liquid crystal display device is employed as means for displaying the contents of a picture, the above second problem will not be overcome, that is, the costly signal transmission system has to be employed.

SUMMARY OF THE INVENTION

An object of the present invention is to provide a control system for a picture displaying apparatus. By the control system, the master still picture conference apparatus and the slave picture displaying apparatus are miniaturized and this the cost of the signal transmission system to be used for transmitting a display signal from the master still picture conference apparatus to the slave picture displaying apparatus is reduced.

To achieve the above object, the following control system for the picture-display apparatus is provided, which system comprises: a first picture-display apparatus comprising:

- a first display device having a screen for displaying pictures on said screen so that said screen is refreshed at frequent predetermined screen refreshing intervals;
- a first display-device control means for outputting the displaying data to said first display device at said frequent predetermined screen refreshing intervals;
- storing means for storing the displaying data;
- a displaying-data control means for reading the displaying data stored in said storing means at frequent predetermined screen renewal intervals, said displaying-data control means then outputting the read displaying data to said first display-device control means; and
- wherein said first picture-display apparatus outputs the displaying data to at least one second picture-display apparatus at said frequent predetermined screen renewal intervals.

Further, said first display device comprises a liquid crystal display device.

Furthermore, said second picture-display apparatus comprises a picture management means for managing a picture displayed by said second picture-display apparatus, said picture management means outputting, to said first picture-display apparatus, a picture management signal in response to the management performed on a picture displayed by said second picture-display apparatus, and said first picture-display apparatus renewing, according to the received picture management signal, the displaying data stored in said storing means.

By the above construction, the displaying data is transmitted from the first picture-display apparatus to the second picture-display apparatus at a relatively slow speed (that is, with relatively long intervals in the data transmission, in comparison to the screen refreshing speed). Thus, a frequency band associated with a signal carrying the displaying data may be limited to a relatively narrow range. This results in a reduction in the cost of the data transmission system to be used for the displaying-data transmission. Further, the user associated with the second picture-display apparatus may manage a picture displayed on the display devices of both the first and second picture-display apparatus, as occasion demands, because of the following. The picture management signal is transmitted from the second picture-display apparatus (slave apparatus) to the first picture-display apparatus (master apparatus). As a result, the first picture-display apparatus then renews (modifies or manages) the displaying contents (displaying data) according to the received picture management signal. Then the first picture-display apparatus displays the renewed displaying contents by the first display device, and the first picture-display apparatus transmits then the renewed display contents to the (plurality of) second picture-display apparatus.

Other objects and further features of the present invention will become more apparent from the following detailed description when read in conjunction with the accompanying drawings.

BRIEF DESCRIPTION OF THE DRAWINGS

FIG. 3 shows a construction of a master apparatus according to the embodiment of the present invention;

FIG. 4 shows a constitution of a slave apparatus according to the embodiment of the present invention;

FIG. 11 shows a block construction of a communication control device in the master apparatus according to the embodiment of the present invention;

FIGS. 13A to 13E show waveform time charts associated with the displaying signal VV according to the embodiment of the present invention;

FIGS. 19A and 19B show a signal for the call control, according to the embodiment of the present invention;

FIG. 23 shows a frame adjustment signal according to the embodiment of the present invention;

DESCRIPTION OF THE PREFERRED EMBODIMENT

A still picture conference system according to an embodiment of the present invention will now be described with reference to FIG. 1.

The still picture conference system uses ISDN (Integrated Service Digital Network) as a transmission network. The still picture conference system comprises a master apparatus MR and four slave apparatus SL1, SL2, SL3, and SL4. The master apparatus MR has all the functions of the above mentioned still picture conference apparatus. Each of the four slave apparatus SL1 to SL4 has such functions as the picture displaying function and part of the picture managing function of the above still picture conference apparatus. The master apparatus MR includes a scanner device SCN and a page printer PPR. The scanner device SCN reads an original picture at a predetermined resolution rate. The page printer PPR prints out various documents at a predetermined resolution rate. The master apparatus MR and the four slave apparatus SL1 to SL4 are coupled together through cables CL so that they form a chain.

Figure 2:
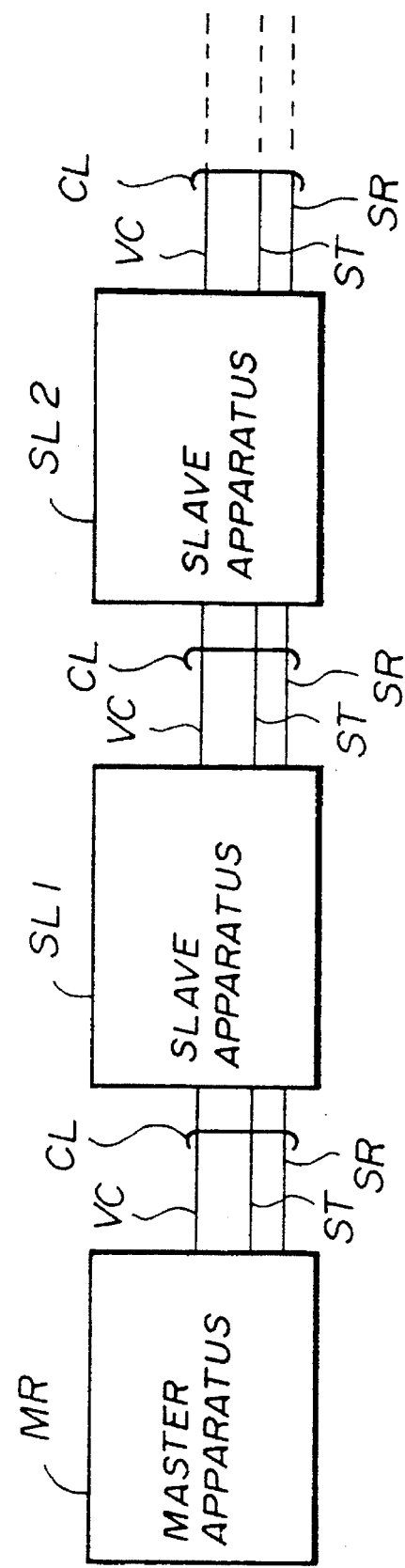
FIG. 2 shows an embodiment of a circuit connection in the system of FIG. 1.
Figure 5:
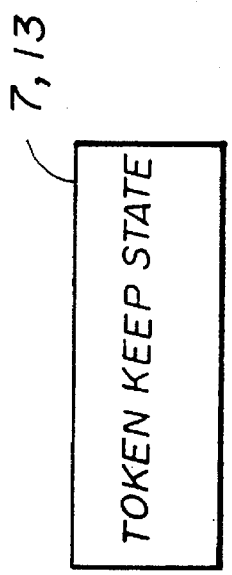
FIG. 5 shows an engraving on a token switch according to the embodiment of the present invention.

Each of the cables CL comprises three signal lines VC, ST and SR, as shown in FIG. 2. The line VC is used for transmitting a display signal so as to distribute it from the master apparatus MR to the slave apparatus SL1 to SL4. The line ST is used for transmitting various other signals from the master apparatus MR to the slave apparatus SL1 to SL4. The line SR is used for transmitting various other signals from the slave apparatus SL1 to SL4 to the master apparatus MR.

One embodiment of the picture conference apparatus used as the master apparatus MR will now be described with reference to FIG. 3. The still picture conference apparatus (master apparatus MR) uses the ISDN as a transmission line therefor, the apparatus MR being used for executing a conference operation between the MR apparatus (first terminal) and another MR apparatus (second terminal).

In FIG. 3, the master apparatus MR comprises a main unit 1 which has the following functions for executing a conference: a speech function, a facsimile function for transmitting and/or receiving data of documents to be utilized in the conference, a tele-writing communication function for drawing pictures, as occasion demands, on a still picture such as a document used in the conference, a still picture conference function for enabling the proceedings of the conference to continue, and a document storing function for storing data concerning documents used in the conference. (The term "still picture conference function" means that a display screen has, for example, 1280 * 960 pixels or 1280 * 1024 pixels and that the display screen may be used for representing two-value and still pictures (images) distributed through a facsimile.) The master apparatus MR further comprises the scanner device SCN and the page printer PPR. The scanner device SCN reads an original picture at a predetermined resolution rate. The page printer PPR prints out various documents at a predetermined resolution rate. The page printer has functions for reading original pictures comprising a book and for reading a plurality of sheets successively.

A liquid crystal display device 2 is provided in the main unit 1. The LCD device 2 is capable of displaying 1280 times 1024 dots, a touch panel device 3 being provided in the LCD device 2. The touch panel device 3 is used for specifying a desired point located on the display screen of the LCD device 2. The desired point may be specified by using a touch pen 4. A telephone handset 5 for speech communications is also included in the main unit 1. A slot in a floppy disc device 6 is formed on a side wall of the main unit 1 and a token switch 7 is provided on a top panel of the main unit 1. The floppy disc device 6 is used for storing various data and the token switch 7 is used for indicating commencement and termination of a displayed-picture managing right (token). The token switch 7 integrates two lights (green and red) therein respectively indicating the ON (keep) and OFF (released) states of the displayed-picture managing right (token).

As the constructions of the slave apparatus SL1 to SL4 are identical to each other, only the slave apparatus SL1, as shown in FIG. 4, will now be described.

A LCD device 11 is provided in the main unit 1. The LCD device 11 is capable of displaying 1280 times 1024 dots, a touch panel device 12 being provided in the LCD device 11. The touch panel device 12 is used for specifying a desired point located on the display screen of the LCD device 11. The desired point may be specified by using a touch pen 14. A token switch 13 is provided on a top panel of the slave apparatus SL1. The token switch 13 is used for indicating termination of a displayed-picture managing right (token). The token switch 13 integrates a light (green) therein indicating the ON (keep) state of the displayed-picture managing right (token).

The words "TOKEN KEEP STATE" are engraved on respective pressing surfaces of both token switches 7 (MR) and 13 (SL) so that a user may easily confirm whether the token (right) is ON (keep) or OFF (released).

The above mentioned tele-writing communication function will now be described.

Figure 6:
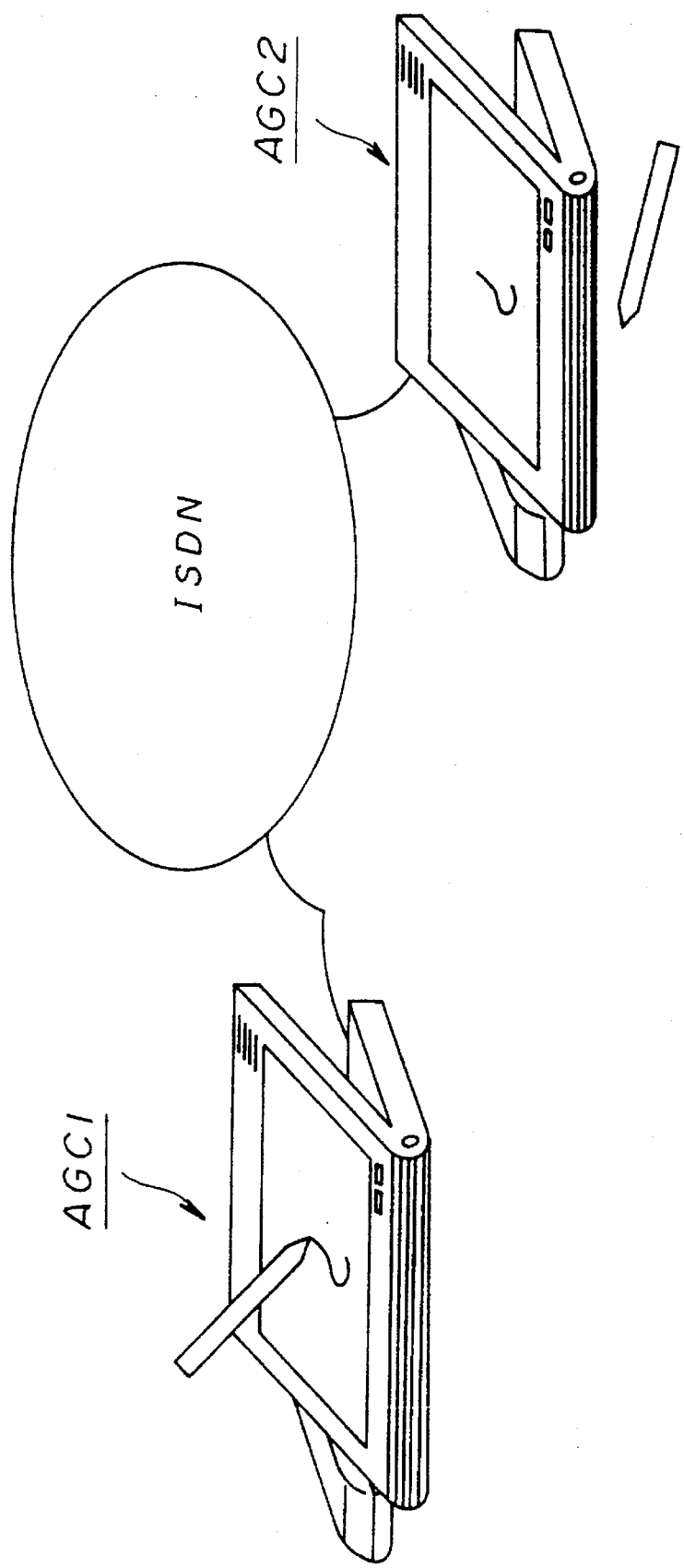
FIG. 6 shows a general diagram for describing a tele-writing communication function according to the embodiment of the present invention.

By using the tele-writing communication function, the following operation can be realized. As shown in FIG. 6, first and second still picture conference apparatus AGC1 and AGC2, for example, are used for a conference. The apparatus AGC1 and AGC2 are coupled together through the ISDN. Thus, when a person using the first apparatus AGC1 draws a picture on the screen (picture drawing operation) of the first apparatus AGC1, a picture, identical to the picture drawn on the screen of the first apparatus AGC1, is simultaneously (in real time) automatically drawn (displayed) on the screen of the second apparatus AGC2 via the ISDN and the second apparatus AGC2.

Employing such a tele-writing communication function enables a conference in which users respectively use both the first and second apparatus to refer to a common document, to confirm that a picture drawn by one user is identical to the picture of the other user, and employing a speech function that enables the users to speak to each other. Thus, a smooth and effective conference can be realized. Further, a picture drawing right can be specified. As a result of the indicating of the picture drawing right (token) kept by one apparatus from between the first and second apparatus, only the one apparatus having the picture drawing right (token) can perform a picture drawing operation.

Figure 7:
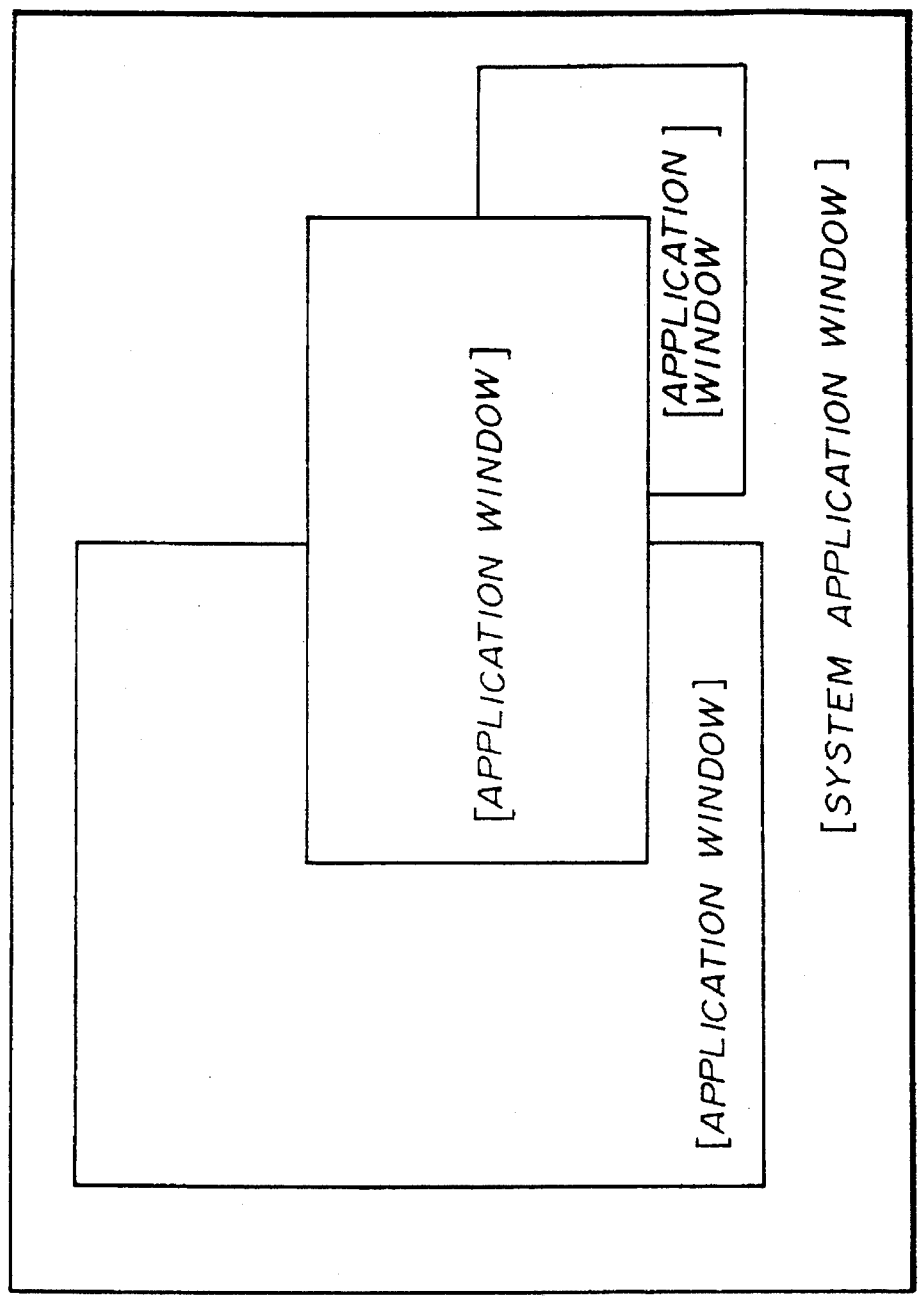
FIG. 7 shows a general diagram for describing a multi-window management (operation) environment according to the embodiment of the present invention.

In the still picture conference system using the master apparatus MR and the slave apparatus SL1 to SL4, the users respectively using the master apparatus MR and slave apparatus SL1 to SL4 execute all operations through a respective one of the touch panel devices 3, 12, 12, 12 and 12. A windowing environment (as shown in FIG. 7), for example, for human-machine interface for realizing the operations using the touch panels 3 and 12, is provided in the still picture conference system. (Such a windowing environment is an operating system or shell that presents a user with specially delineated areas of a screen called windows. Each window can act independently, as if it were a virtual display device.)

Figure 8:
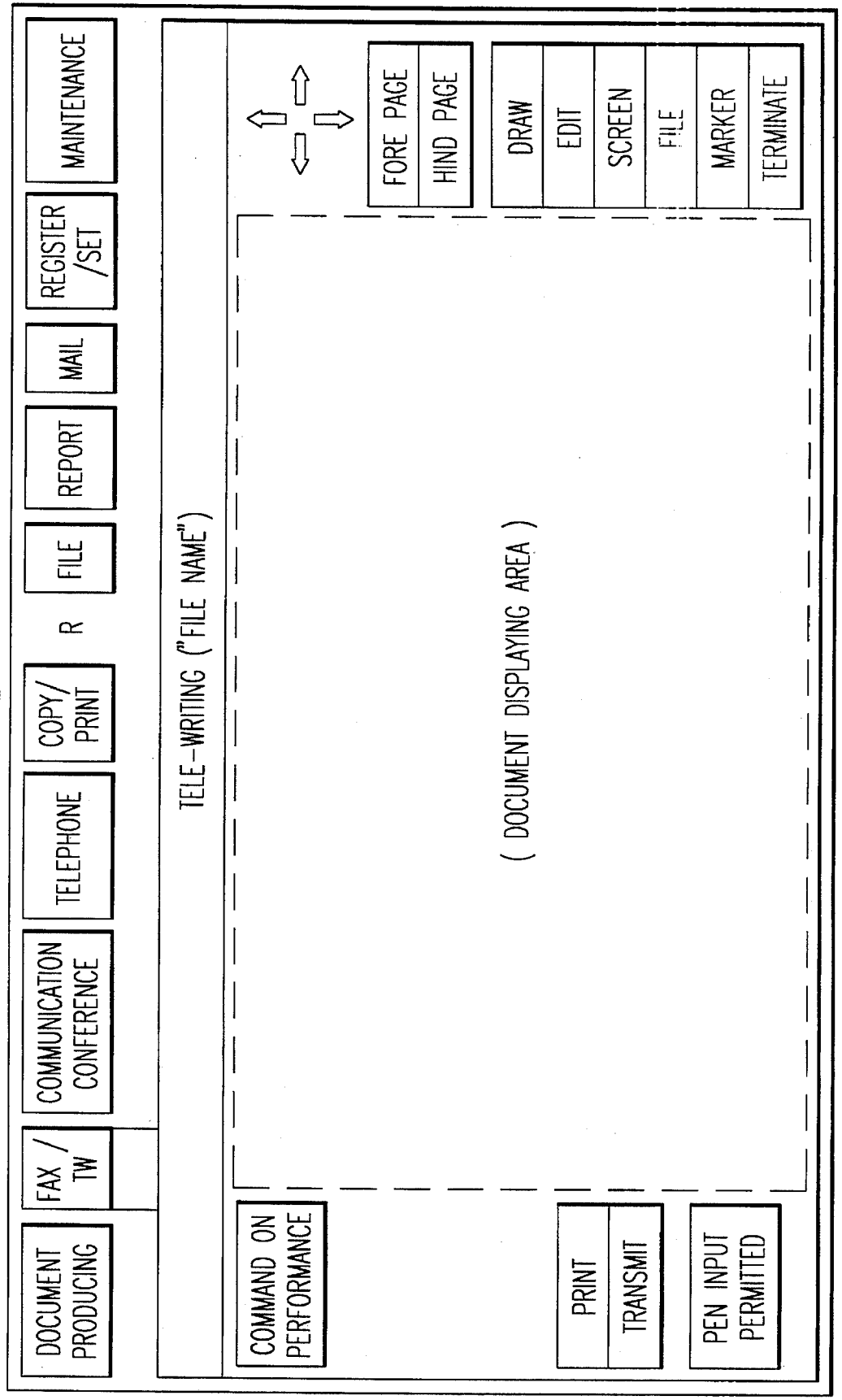
FIG. 8 shows a general diagram of a tele-writing application window according to the embodiment of the present invention.

An example of such user's operations to operate the still picture conference system comprising operations concerning the tele-writing communication function, the operations being performed using the windowing environment, will now be described, with reference to FIG. 8 showing operation windows. The operation windows comprise a system application window (as a background of the picture displayed on the screen) and an application window associated with a tele-writing application, the tele-writing application window being located in the center of the system application window. The system application window has various menu selecting buttons located on the top thereof. The menu selecting buttons are used for selecting an application from among various applications, which applications may be performed with the master apparatus MR (and the four slave apparatus SL1 to SL4).

In the tele-writing application window, an application name corresponding to the window itself (in this case, "TELE-WRITING") and a file name, document contents of the file corresponding to the name being displayed on the tele-writing application window, are displayed on the top horizontally-extending bar of the tele-writing application window. A document displaying area is provided in the center of the tele-writing application window. The document displaying area, the size of which is approximately half the A4 size, displays the document contents.

A plurality of symbols and buttons are arranged on the right side of the document displaying area, which symbols and buttons are used for selecting, from among various managements, one management to be performed on the document presently displayed on the document displaying area. In the example shown in FIG. 8, the symbols and buttons include (starting from the top): picture scrolling symbols for moving the contents (of the document) currently displayed on the document displaying area a predetermined amount and in a predetermined direction, a fore page (the page preceding, by one page, from the present page) page button for changing a page (of the document) to be displayed on the document displaying area to the fore page, a hind page (the next page of the present page) button for changing a page (of the document) to be displayed on the document displaying area to the hind page, a draw button for performing therewith various picture drawing operations on the picture currently displayed on the document displaying area, an edit button for, as occasion demands, deleting the contents of the picture currently displayed on the document displaying area, a screen button for modifying a manner of displaying the picture on the document displaying area, a file button for selecting one from among various filing operations (including, for example, reading, saving, deleting, renaming, and copying operations of files) so as to file the currently displayed document, a marker button for specifying a marker mode to specify a desired position in the currently displayed picture on the document displaying area, and a terminate button for terminating execution of the tele-writing communication function.

Further, the document displaying area includes, on the left side thereof, state displaying areas for displaying states of various processes, and also includes function buttons for selecting various managements such as, for example, printing and transmitting of data.

Figure 9:
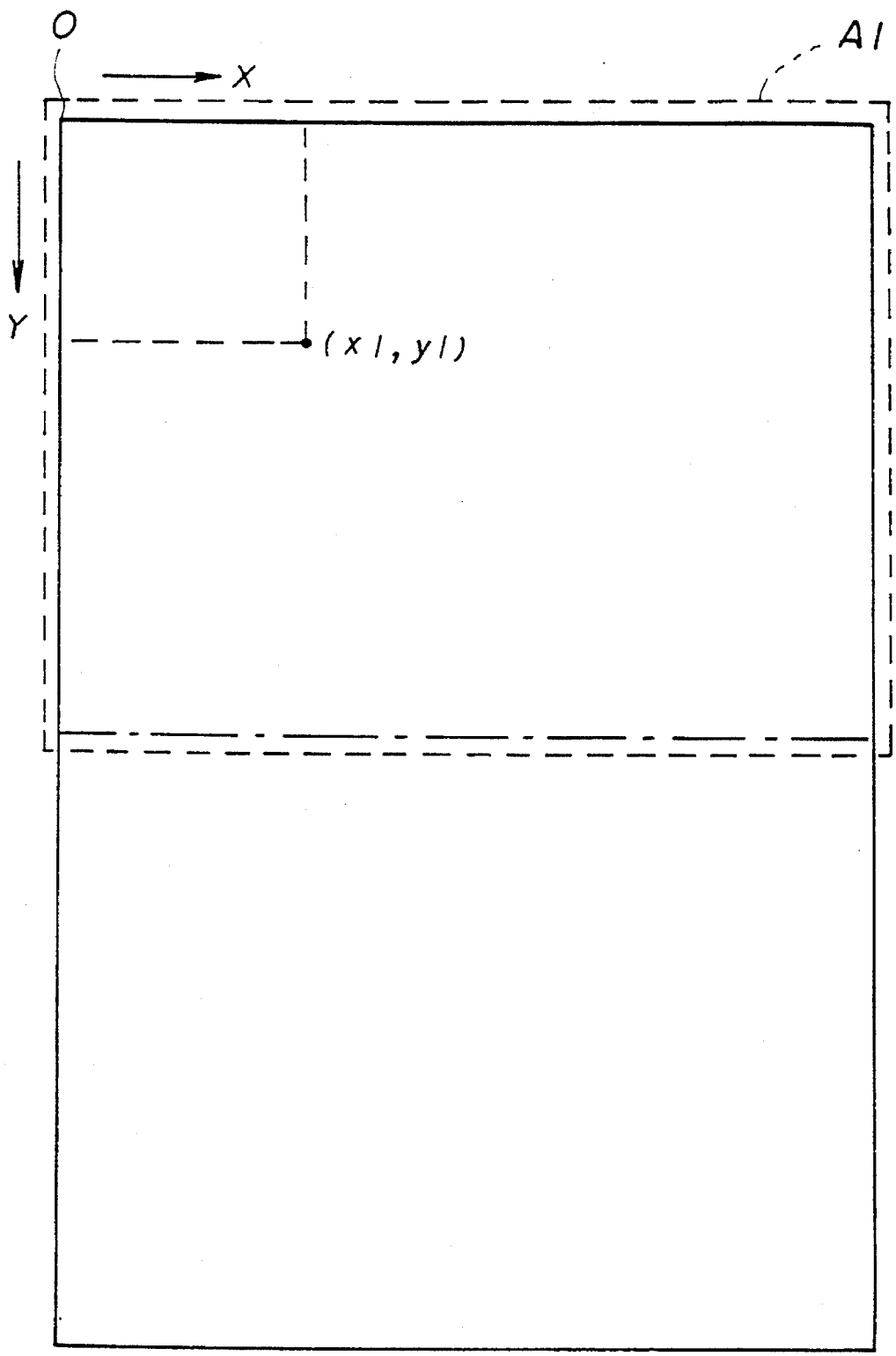
FIG. 9 shows a general diagram for describing a method for specifying a coordinate position in a tele-writing communication function according to the embodiment of the present invention.

The size and the resolution rate of the displaying screen in a communication terminal apparatus employing such tele-writing functions may vary depending on the particular type of communication terminal apparatus. Thus, it is necessary to define a method for specifying a coordinate position on a page of a document to be handled with such tele-writing functions, which method may be applied to various types of communication terminal apparatus. This method may be performed so that, as shown in FIG. 9, the origin is determined to be the top-left point O of a page, the X-direction is determined to be the rightward direction (identical to the main scanning direction in the facsimile function) and the Y-direction is determined to be the direction (identical to the sub-scanning direction in the facsimile function) perpendicular to (displaced by a 90 degree angle from) the determined X-direction. Then, a desired coordinate point may be specified in the X-Y coordinates of the BMU unit, wherein 1 BMU=(25.4 mm/1200).

A size of a document allowed to be displayed in the above document displaying area in the application window in the windowing environment of the tele-writing function corresponds to the size of an area A1 defined by the dashed line in FIG. 9.

Figure 10:
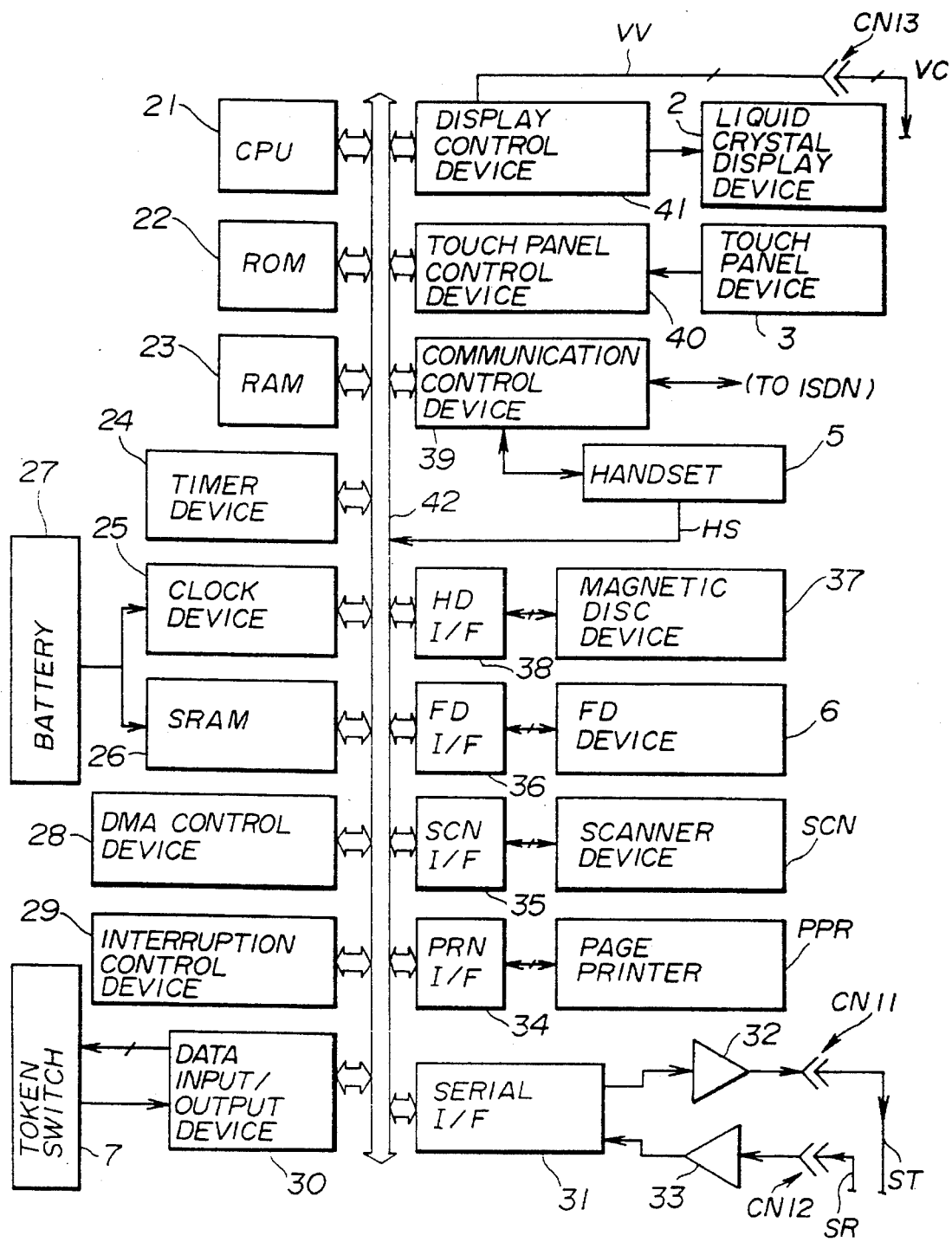
FIG. 10 shows a block construction of the master apparatus according to the embodiment of the present invention.

A construction of the master apparatus MR will now be described with reference to FIG. 10.

A CPU (Central Processing Unit) 21 is used for controlling various devices provided in the master apparatus MR; for executing a speech function, a facsimile communication function, a tele-writing communication function, a still picture conference function, a document storing function for storing various documents to be utilized in a conference; and for controlling functions such as a data transmission function for transmitting data among the four slave apparatus SL1 to SL4. A ROM (Read Only Memory) 22 is used for storing therein information including control programs to be executed by the CPU 21, and data such as various parameters to be used by the CPU 21 so as to execute the control programs. A RAM (Random Access Memory) 23 is used for forming a work area to be used by the CPU 21.

A timer device 24 is used for realizing various timer functions. A clock device 25 is used for outputting current clock information. A SRAM (Static RAM) 26 is used for storing various information items associated, in particular, with the present master apparatus MR. A battery 27 is used for backing up the clock device 25 and the SRAM 26.

A DMA (Direct Memory Access) control device 28 is used for, without using the CPU 21, transferring data at a high speed among devices peripheral to the CPU 21. An interruption control device 29 is used for controlling the provision, to the CPU 21, of frequently occurring interruption signals.

A data input/output device 30 is used for inputting thereto an operation signal associated with the token switch 7 and for outputting a light-turning-on signal therefrom. A serial interface device 31 is used for transferring data via the signal lines ST and SR among the four slave apparatus SL1 to SL4. An output signal provided from the serial interface device 31 is provided, and via a driver device 32, and via contacts of a cable connector CN11, to the signal line ST. A receiving signal received from the signal line SR is applied, via contacts of a cable connector CN12, and via a receiver device 33, to the serial interface device 31.

A printer interface device 34 is used for printing so as to output pictures (documents) through a page printer PPR coupled to the device 34. A scanner interface device 35 is used for reading so as to input original pictures (documents) through a scanner device SCN coupled to the device 35. A floppy disc interface device 36 is coupled to a floppy disc device 6 and used for storing data in/reading data from/ deleting data from a recording medium (floppy disc).

A magnetic disc device 37 is used for storing a huge quantity of information, including information on various documents. A magnetic disc interface device 38 is coupled to the magnetic disk device 37 and used for storing data on/reading data from/deleting data from the recording medium (magnetic disc) using the magnetic disc device 37.

A communication control device 39 is coupled to the ISDN and used for performing a subordinate-position-layer communication function: a call control function in D-channel (signal channel), a speech function, a facsimile communication function, a tele-writing communication function, and a still picture conference function, in B-channel (information channel). A handset 5 is coupled to this communication control device 39.

A touch panel control device 40 is used for determining, based on a signal output from the touch panel device 3, a coordinate position input through the touch panel device 3, and for providing information associated with the determined input coordinate position. The determined input coordinate position is, in particular, with respect to a coordinate system associated with the touch panel device 3. A display control device 41 is used for controlling a picture displayed through the LCD device 2. A displaying signal VV provided from the display control device 41 is provided, via a cable connector CN13, to the signal line VC.

The CPU 21, ROM 22, RAM 23, timer device 24, clock device 25, SRAM 26 DMA control device 28, interruption control device 29, data input/output device 30, serial interface device 31, printer interface device 34, scanner interface device 35, floppy disc interface device 36, magnetic disc (hard disc) interface device 38, communication interface device 39, touch panel control device 40 and display control device 41 are respectively coupled to a system bus 42. Thus, data transferring among the above devices is performed mainly through the system bus 42. A hook signal HS indicating a hooking state of the handset 5 is sent, through the system bus 42, to the CPU 21. A microphone and speaker (not shown in FIG. 10) are provided parallel to the handset 5 and used for executing a speech during a conference communication. The microphone and speaker may be used instead of the handset 5 for inputting/outputting of a voice during a conference communication.

The communication control device 39 will now be described with reference to FIG. 11.

An ISDN interface device 45 is coupled to the ISDN and has a function for signal processing for the layer-1 of the ISDN and a function for integrating/separating signals transmitted/received via the D-channel and the two B-channels. The ISDN interface device 45 transmits a D-channel's signal to/receives a D-channel's signal from a D-channel (LAPD) transmitting/receiving control device 46 and transmits the two B-channels' signals to/receives the two B-channels' signals from a multiplication/separation device 47.

The LAPD channel transmitting/receiving control device 46 is used for realizing a signal processing function associated with the layer-2 of the D-channel. The multiplication/ separation device 47 is used for multiplying data associated with a plurality of media, the data to be multiplied including voice data and other general data and being transmitted/ received via the B-channels, used for forming and transmitting, to the transmission circuit, frame data specified in the CCITT (International Telegraph and Telephone Consultative Committee) recommendation H. 221, and used for separating data associated with the plurality of media, the data to be separated having been multiplied into received frame data. This multiplication/separation device 47 transmits voice data to/receives voice data from a voice CODEC device 48 and transmits two-channels' general data to/receives two-channels' general data from LAPB control devices 49 and 50. If this multiplication/separation device 47 is not used for executing the function corresponding to the recommendation H. 221, the multiplication/separation device 47 acts as a selector to be used for connecting, in a desired manner, the two B-channels obtained as a result of data separation executed by the ISDN interface device 45, to the two LAPB control devices 49 and 50.

The voice CODEC device 48 is used for executing an (analog signal)/(digital data) signal conversion process that the device 48 transmits an analog voice signal using the ISDN B-channel. Further, the voice CODEC device 48 has two types of conversion modes, a 64 Kbps data conversion rate used in a normal speaking operation and a 56 Kbps data conversion rate used in a media multiplication operation. The LAPB control devices 49 and 50 are used for realizing a signal processing function associated with the layer-2 of the ISDN B-channels.

A group-3-facsimile modem device 51 is used for realizing a modem function associated with a group 3 facsimile and has a low-speed modem function (V. 21 modem) for transmitting/receiving a transmission procedure signal and a high-speed modem function (including: V. 33 modem, V. 29 modem, V. 27 modem) for transmitting/receiving mainly picture information.

A switching device 52 is used for connecting the voice CODEC 48 to either the handset 5 or the group-3-facsimile modem device 51. Operations performed by the switching device 52 and the multiplication/separation device 47 are controlled by the CPU 21.

Figure 12A:
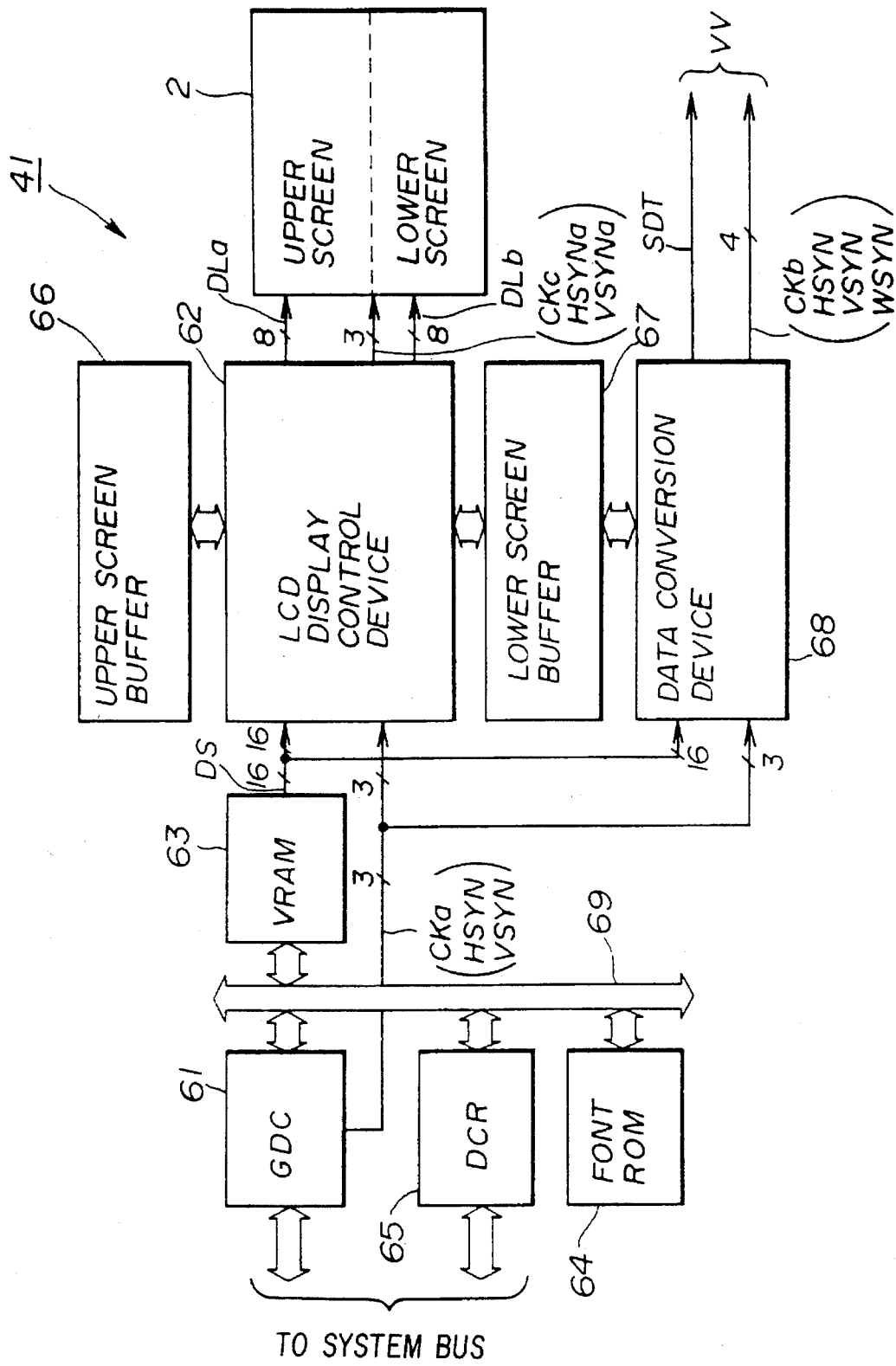
FIGS. 12A and 12B show a block construction of a display control device in the master apparatus according to the embodiment of the present invention.

The display control device 41 will now be described with reference to FIG. 12A.

A GDC (Graphic Device Controller) 61 is used for controlling picture contents to be displayed through the LCD device 2, and has functions which include the following picture processing functions: a function for expanding (or decoding) character code data to a figure character data (font data), a function for arranging the expanded (or decoded) figure character data to bit map data, a function for magnifying/reducing a size of a picture to be displayed, a function for reversing dot colors, a function for drawing figures including straight lines, circles, oval shapes, and squares, a function for determining displaying attributes, including the boldness of drawn figure's lines, and a function for masking a drawn figure. Further, the GDC 61 controls a displaying timing associated with a LCD display control device 62. The GDC 61 uses a VRAM 63 as a work area and thus the above obtained bit map data associated with the picture to be displayed is stored in the VRAM 63. The GDC 61 also controls an operation to read data from the VRAM 63. A font ROM 64 is used fop storing figure character data corresponding to respective character code data.

A coding and decoding device 65 is used for compressing so that the device 65 codes a picture signal and restores coded picture information to the original picture signal, and has coding and decoding functions for both a group-3-facsimile mode and a group-4-facsimile mode. Further, the coding and decoding device 65 also utilizes the VRAM 63 as a work area.

As mentioned above, the VRAM 65 is commonly utilized as a work area by both the GDC 61 and the coding and decoding device 65. Thus, the number of memories required for the display control device 41 may be reduced. A memory exclusive collision control is performed so as to prevent a common address in the VRAM 63 from being simultaneously accessed by both the GDC 61 and the coding and decoding device 65.

The liquid-crystal-display-device display control device (LCD display control device) 62 is used for extracting displaying data from a predetermined area in the VRAM 63, the predetermined area containing data associated with a picture to be displayed. The LCD display control device 62 then outputs the extracted data so as to display it through the LCD device 2.

Certain factors including operations of the LCD device 2, these operations including a screen responsive performance, define a picture-renewal speed for renewal of a picture stored in the VRAM 63 so that 5 frames can be renewed in 1 second. Further, operations of the LCD device 2 define a screen-refreshing speed for refreshing the screen of the LCD device 2 so that 72 frames can be refreshed in 1 second.

Displaying data stored in the VRAM 63 is output therefrom as 16 bit parallel data to the LCD display control device 62. The screen of the LCD device 2 is divided into two parts: an upper screen and a lower screen. An upper screen buffer 66 and lower screen buffer 67 are provided for LCD display control device 62. The upper screen buffer 66 is used for temporarily storing displaying data DLa to be output through the upper screen and the lower screen buffer 67 is used for temporarily storing displaying data DLb to be output through the lower screen. The LCD display control device 62 outputs the displaying data DLa and DLb respectively stored in the buffers 66 and 67, as 8 bit parallel data, to the upper and lower screens of LCD device 2, respectively.

In the above-mentioned construction, since the resolution of the LCD device 2 is 1280 times 1024, the frequency of a clock signal CKa to be used for transferring, by means of the GDC 61, the displaying data DS to the LCD display control device 62 should be 409.6 KHz. Further, the frequency of a horizontal synchronizing signal HSYN indicating a starting timing of each line of the displaying data DS to be output to the LCD display control device 62 by means of the GDC 61 should be 5.12 KHz. Furthermore, the frequency of a vertical synchronizing signal VSYN indicating a starting timing of each screen of the displaying data DS to be output to the LCD display control device 62 by means of the GDC 61 should be 5 Hz.

Further, the frequency of a clock signal CKc to be used for transferring, from the LCD display control device 62, the displaying data DLa and DLb to the LCD device 2 should be 5.89824 MHz. Further, the frequency of a horizontal synchronizing signal HSYNa indicating a starting timing of each line of the displaying data to be output from the LCD display control device 62 to the LCD device 2 should be 73.728 KHz. Furthermore, the frequency of a vertical synchronizing signal VSYNa indicating a starting timing of each screen of the displaying data to be output from the LCD display control device 62 to the LCD device 2 should be 72 Hz.

Thus, the LCD display control device 62 successively inputs the displaying data DS, in synchronization with the clock signal CKa, and counts pulses of the horizontal synchronizing signals HSYN. The LCD display control device 62 then stores the input displaying data DS in an appropriate position in the upper screen buffer 66 until the number of counted pulses of the horizontal synchronizing signals HSYN is equal to a predetermined number (640) of lines corresponding to the number of lines of the upper screen of the LCD device 2. The LCD display control device 62 then stores the input displaying data DS in an appropriate position in the lower screen buffer 67 if the number of counted pulses of the horizontal synchronizing signals HSYN exceeds the predetermined number (640) of lines of the upper screen until a pulse of the vertical synchronizing signal VSYN has been input.

Then, the LCD display control device 62, while outputting the clock signal CKc to the LCD device 2, in synchronization with the clock signal CKc, successively reads the 8 bit data from both the upper screen buffer 66 and lower screen buffer 67, and provides the read 8 bit data, as respective data of the displaying data DLa and DLb, to the LCD device 2. Further, the LCD display control device 62 outputs to the LCD device 2 the horizontal synchronizing signal HSYNa, the outputting being executed each time when each line of the displaying data is started, and outputs the vertical synchronizing signal VSYNa, the outputting being executed each time when each screen of the displaying data is started.

Further, the clock signal CKa, the horizontal synchronizing signals HSYN, and the vertical synchronizing signals VSYN, which are output from the GDC 41, and the displaying data DS output from the VRAM 63 are supplied to a data conversion device 68.

The data conversion device 68, in synchronization with the clock signal CKa, successively inputs the displaying data DS and converts the input data DS into the corresponding serial data. The data conversion device 68 then provides the converted serial data as serial displaying data SDT, as shown in FIG. 13E. Further, the data conversion device 68 generates clock signal CKb to be used for transferring the serial displaying data SDT, as shown in FIG. 13A. The data conversion device 68 also generates word synchronizing signal WSYN, as shown in FIG. 13B, which signal indicates word borders with respect to the original displaying data in the serial displaying data SDT. Then, the data conversion device 68 provides the generated clock signal CKb and word synchronizing signal WSYM together with the input horizontal synchronizing signal HSYN as shown in FIG. 13c and vertical synchronizing signal VSYN as shown in FIG. 13d. The frequency of the clock signal CKb should be 6.5536 MHz. The signals CKb, VSYN, HSYN, and WSYN refer to "displaying timings". The displaying timings are necessary to enable the four slave apparatus SL1 to SL4 to distinguish the borders in the transferred picture data.

The following signals output from the data conversion device 68 are output as the displaying signal VV: the serial displaying data SDT, the transferring clock signal CKb, the word synchronizing signal WSYN, the horizontal synchronizing signal HSYN, and the vertical synchronizing signal VSYN.

Further, the GDC 61, VRAM 63, font ROM 64, and coding and decoding device 65 are coupled to an internal bus 69 and transferring of data among these devices may be executed mainly via the internal bus 69.

Figure 12B:
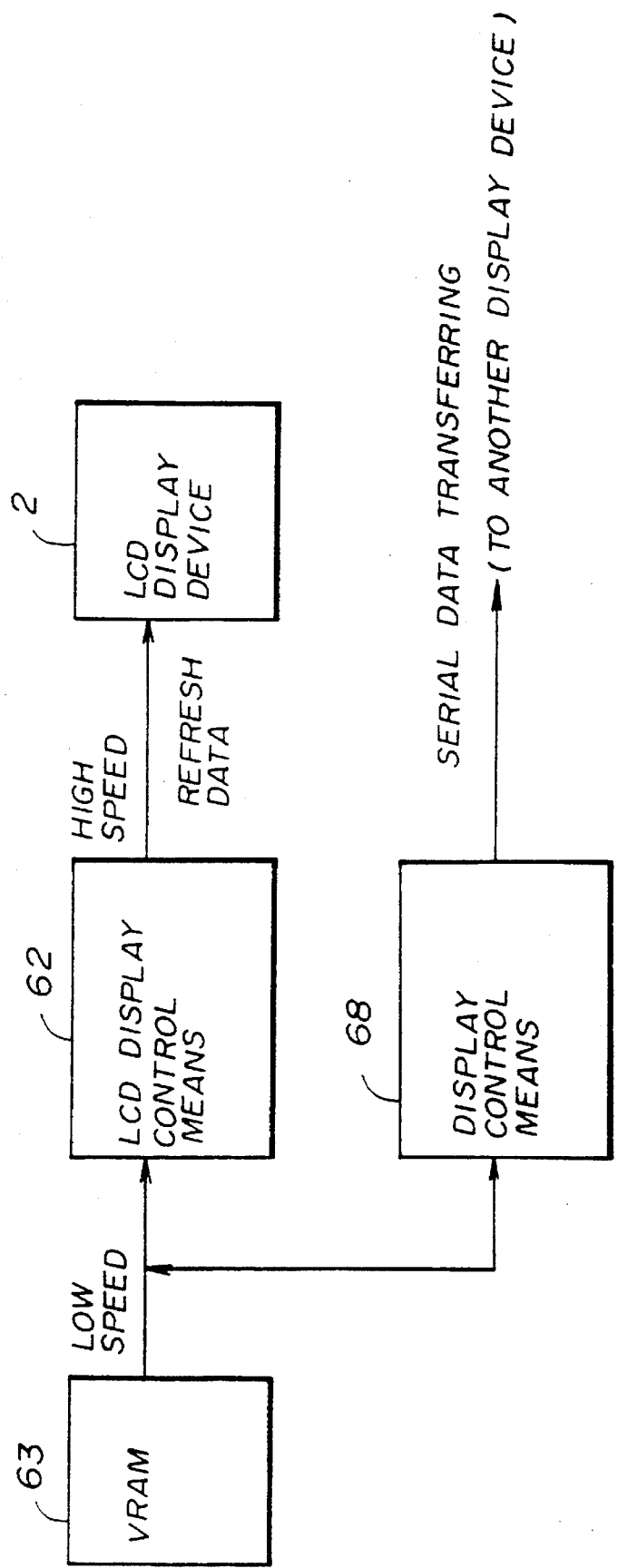

The operation associated with the apparatus shown in FIG. 12A will now be again described partially with reference to FIG. 12B. In FIG. 12B, part of the construction shown in FIG. 12A will be described in other view points.

In FIG. 12B, an LCD display control means 62 acts as the LCD display control device 62. Further, a display control means 68 acts as the data conversion device 68.

The displaying data to be stored in the VRAM 63 may be obtained by the following four methods: 1) the CPU 21 (FIG. 10) coupled to the system bus writes the displaying data on the VRAM 63 through the GDC 61 (FIG. 12A); 2) the CPU 21 coupled to the system bus writes a command on the GDC 61, and then the GDC 61 executes the written command so that the GDC 61 writes graphic data on the VRAM 63; 3) the CPU 21 coupled to the system bus writes a command on the GDC 61, the GDC 61 then executes the written command so that the GDC 61 reads data from the font ROM 64 (FIG. 12A) and then the GDC 61 writes the read data on the VRAM 63; and 4) the DCR 65 (FIG. 12A), in response to a command given by the CPU 21, reads a facsimile code from the system bus, decodes the read code, and then writes the decoded picture data on the VRAM 63.

Generally speaking, such a LCD device needs to have its screen refreshed in approximately 70 screens/second. However, the respondable screen renewal speed of the LCD device is approximately 5 to 10 screens/second. That is, even if the screen of the LCD device is renewed at a renewal speed higher than the above respondable screen renewal speed, this renewal cannot be recognized on the screen because of the characteristics (the displaying capacity of the liquid crystal) of the LCD device. This fact may be utilized for realizing a practical data transferring method as follows. The displaying data is read from the VRAM 63 at a relatively low speed. Thus, the transferring of displaying data to another display device at a practical (not too high) clock frequency may be realized, which displaying data to be transferred to the other display device has been obtained by converting the displaying data read from the VRAM 63 into corresponding serial data.

The following is one example for the above operation.

Pixel number of LCD = 1,280 pixels * 960 lines
= 1,228,800 pixels.

Serial data speed (where the refreshing speed = 70 screens/second) = 1,228,800 * 70
= approximately 86 Mbps.

This obtained serial data speed is too high to be selected for practical (low cost) use as a data speed at which data is transferred, that is, in relatively low cost. Thus, taking the above LCD's characteristics regarding the respondable screen renewal speed into consideration, the serial data speed is preferable to be reduced so it corresponds to a speed 5 screens/second, thus, the serial data speed = 1,228,800 * 5
= approximately 6 Mbps.

This obtained serial data speed can be inexpensively realized by using, for example, a balancing type serial transferring device. Thus, by the following method, a practical (not too expensive) master apparatus (including the display device)/slave apparatus (including another display device) system may be realized. The displaying data is read, at a relatively low speed, from the VRAM and then serial-transferred, at this speed, to another display device, and then the low-speed data is converted into corresponding high-speed data associated with the LCD device of the slave apparatus.

The above case of the refreshing speed being 70 screens/second and the data reading (from VRAM) and transferring (to the LCD display control means 62 and to the other display device through the display control means 68) speed corresponding to 5 screens/second will now be described. Until both the contents of the VRAM and then the contents of the buffers 66 and 67 have been renewed, "identical displaying data" is provided to the LCD device repeatedly at the refreshing speed. That is, during the period while the identical displaying data is being provided, identical pictures are repeatedly used for refreshing the LCD screen.

Figure 14A:
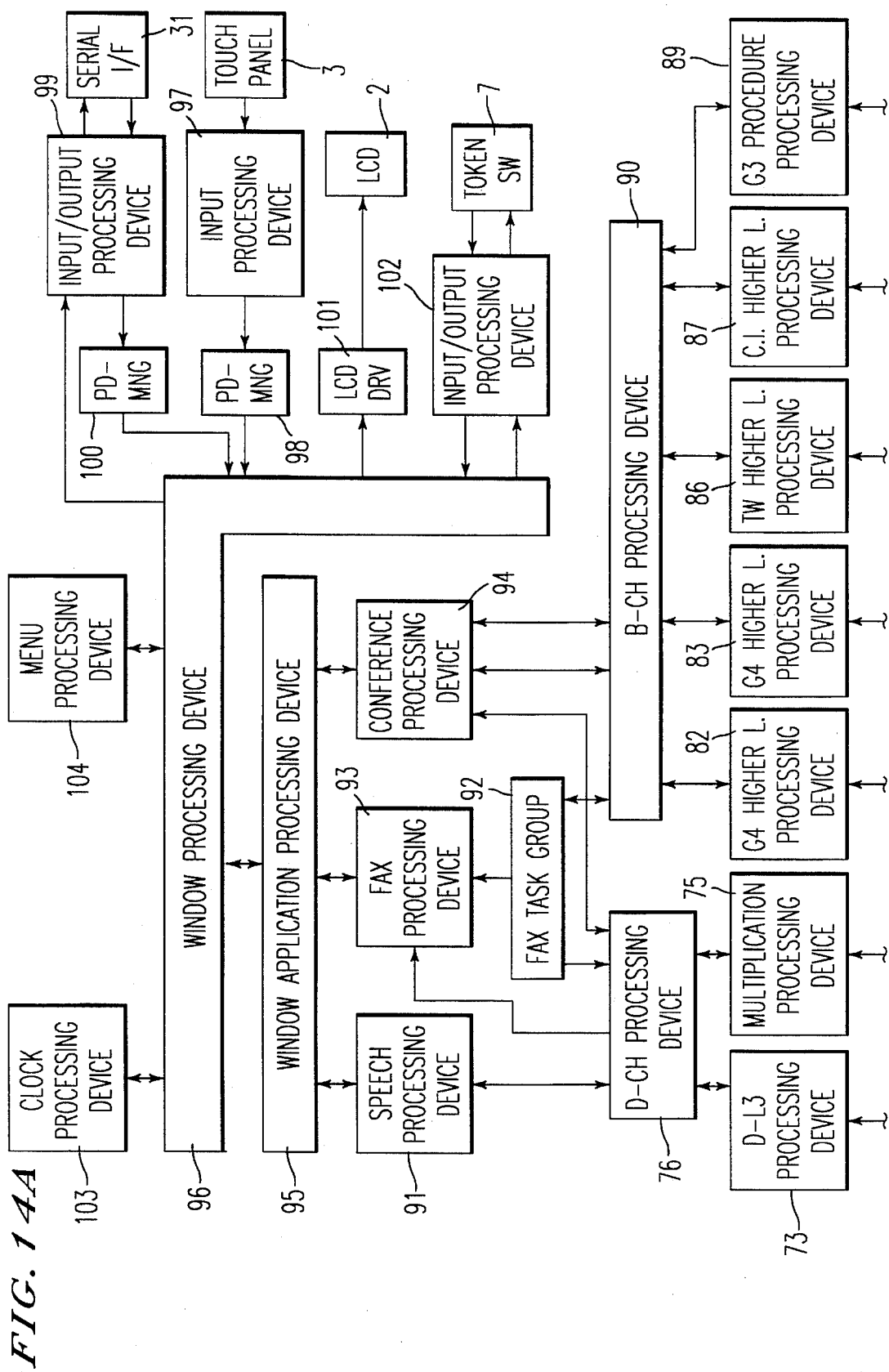
FIG. 14 shows a hardware-and-software system block construction of the master apparatus according to the embodiment of the present invention.
Figure 14B:
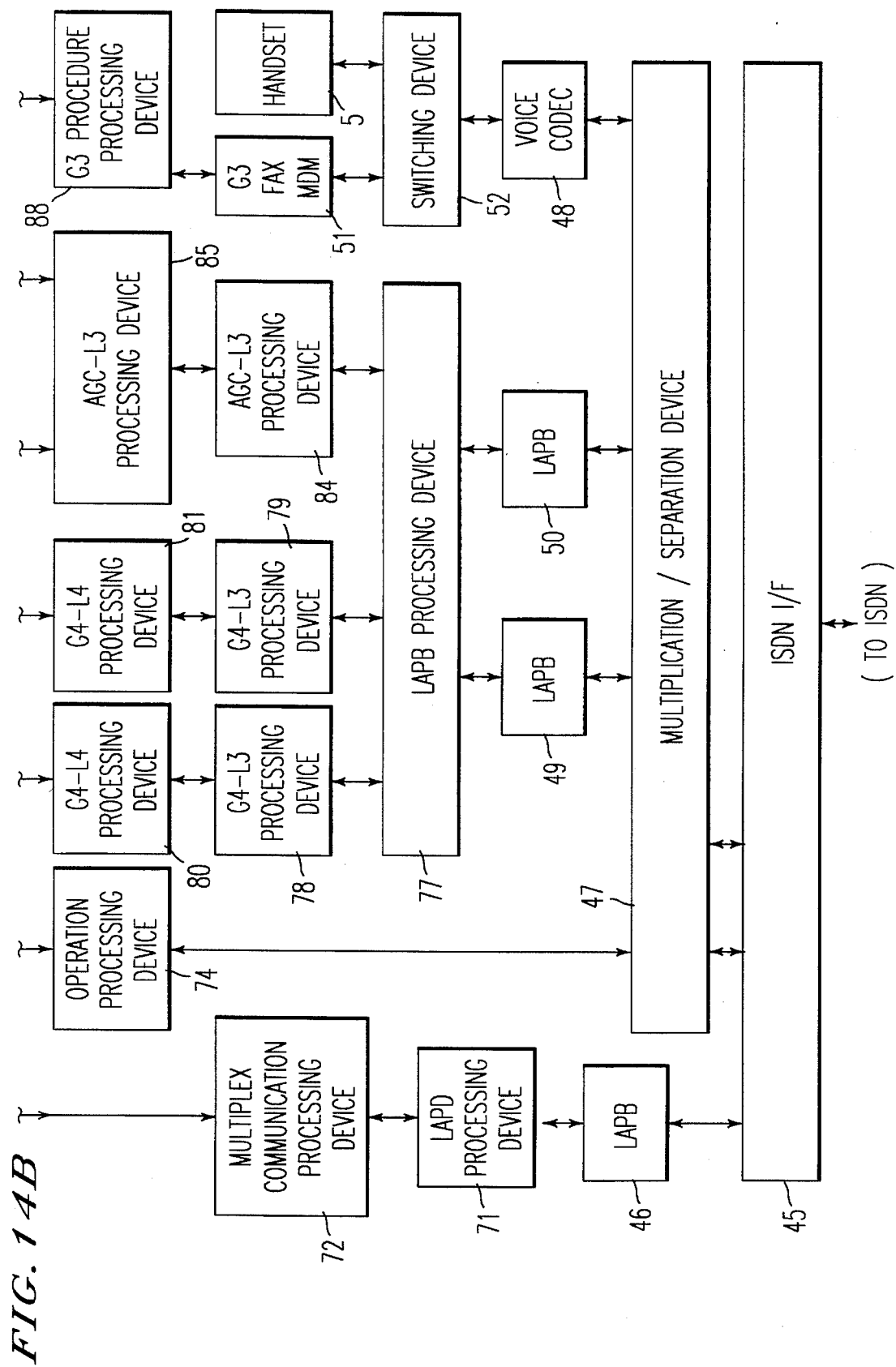

Hardware and software of one example of the master apparatus MR will now be described with reference to FIG. 14. In this example, to realize two independent group-4-facsimile communication operations using the two B-channels, two group-4-facsimile communication systems are provided.

A LAPD processing device (LAPD driver) 71 is used for driving and controlling the LAPD control device 46. A multiplex communication processing device 72 is used for executing a calling controlling process associated with a second calling in the case where the two B-channels are simultaneously used. A D-channel layer-3 processing device 73 is used for a calling controlling process associated with the layer-3 of the D-channel.

An operation controlling device (H. 221 driver) 74 is used for controlling operation modes associated with the multiplication/separation device 47. A multiplication processing device 75 is used for controlling a multi-media protocol of the CCITT recommendation H. 242. A D-channel processing device 76 is used for realizing appropriate interfaces, for the higher processes, of a calling controlling processing service associated with the D-channel and a processing service associated with the multiplication process.

An LAPB processing device (LAPB driver) 77 is used for driving and controlling the LAPB control devices 49 and 50. Group-4-facsimile layer-3 processing devices 78 and 79 are used for processing and controlling the layer-3 (ISO standard IS8208) of the group-4-facsimile communication function. Group-4-facsimile layer-4 processing devices 80 and 81 are used for processing and controlling the layer-4 (CCITT recommendation T. 70) of the group-4-facsimile communication function. Group-4-facsimile higher-layer processing devices 82 and 83 are used for processing and controlling the layer-5 (CCITT recommendation T. 62) of the group-4-facsimile communication function and for processing and controlling the higher layer (for example, CCITT recommendation T. 521) of the group-4-facsimile communication function.

A still-picture-conference-communication layer-3 processing device 84 is used for processing and controlling the layer-3 (ISO standard IS8208) of the still picture conference communication function. A still-picture-conference-communication layer-4 processing device 85 is used for processing and controlling the layer-4 (CCITT recommendation X. 224 (class 2)) of the still picture conference communication function. A tele-writing higher-layer processing device 86 is used for processing and controlling the layer-5 (CCITT recommendation X. 225 (completely duplicated)) of the tele-writing communication function and for processing and controlling the higher layer.

A conference-function higher-layer processing device 87 is used for processing and controlling the layer-5 (CCITT recommendation X. 225 (completely duplicated)) of the conference function (C & I Command and Indication) and for processing and controlling the higher layer.

A group-3-facsimile processing device (group-3-facsimile driver) 88 is used for controlling the operation of the group-3-facsimile modem 51. A group-3-facsimile procedure processing device 89 is used for executing the higher layer processes, including the group-3-facsimile transmission procedure process (CCITT recommendation T. 30).

A B-channel processing device 90 is used for realizing interfaces between the following services/process and the higher processes associated with them: the group-4-facsimile communication processing service, the tele-writing communication processing service, the conference function processing service, and the group-3-facsimile processing. Further, in this embodiment, to enable bulk transferring operations for documents during progress of a conference, data transmission/receiving operations may be executed between the group-4-facsimile higher-layer processing device 83 and the still-picture-conference-communication layer-4 processing device 85.

A communication processing device 91 is used for reporting to the higher process (speech window application process) a call detection signal report obtained from the D-channel processing device 76 and used for reporting to the D-channel processing device 76 a calling request from the higher processes.

A facsimile task group 92 is used for realizing a parallel processing of a plurality of processes associated with the group-4-facsimile communication function and the group-3-facsimile communication function. Further, the facsimile task group 92 executes calling requesting sent to the D-channel processing device 76 in response to a relevant report from the higher processes.

A facsimile processing device 93 is used for processing processes associated with the group-4-facsimile communication function and the group-3-facsimile communication function. The D-channel processing device 76 provides called reports for the group-4-facsimile communication function and the group-3-facsimile communication function to the facsimile processing device 93.

A conference processing device 94 is used for processing processes associated with the still picture conference, and this processing uses the conference function, the tele-writing function and the bulk transferring function for documents. The conference processing device 94 executes reporting of calling and called operations between the D-channel processing device 76 and the device 94 itself.

A window application processing device 95 is used for realizing management executed by a user, the management being performed on the following applications: a speech application, a facsimile application (including a group-4-facsimile application and a group-3-facsimile application), and a conference application (including the speech application, a tele-writing application, a C & I application and a bulk transferring application for documents). The management is also performed on the various applications normally desired for such a system, such as a report application, a setting and registering application and a maintenance application.

A window processing device 96 is used for providing the window application processing device 95 with a multi-windows' window management environment processing service. An input processing device 97 is used for bringing into the system the input coordinate signal from the touch panel control device 40. The brought input coordinate signal is then sent, via a pointing-device processing device 98, to the window processing device 96.

An input/output processing device 99 is used for executing data transmitting/receiving processing among the master apparatus MR and the four slave apparatus SL1 to SL4, the processing being executed via the serial interface device 31. The coordinate signal (to be described below) input via the serial interface device 31 is then sent, via a pointing-device processing device 100, to the window processing device 96. Further, data output from the window processing device 96 is sent to the input/output processing device 99.

A liquid-crystal-display-device control device (liquid-crystal-display-device driver or LCD control device) 101 is used, in response to a picture display request from the window processing device 96, for controlling the GDC 61 so as to renew contents currently displayed through the LCD device 2. An input/output processing device 102 is used for transmitting/receiving data between the window processing device 96 and the token switch 7.

A clock processing device 103 is used for, in response to an appropriate request provided by the window processing device 96, reading current clock information and then providing the information to the window processing device 96. A menu processing device 104 is used for generating displaying information for displaying a menu specified in response to an appropriate request provided by the window processing device 96, and then providing the generated displaying information to the window processing device.

As mentioned above, the system of hardware and software of the present example of the master apparatus MR is constituted hierarchically from the lower processes to the higher processes successively.

Figure 15:
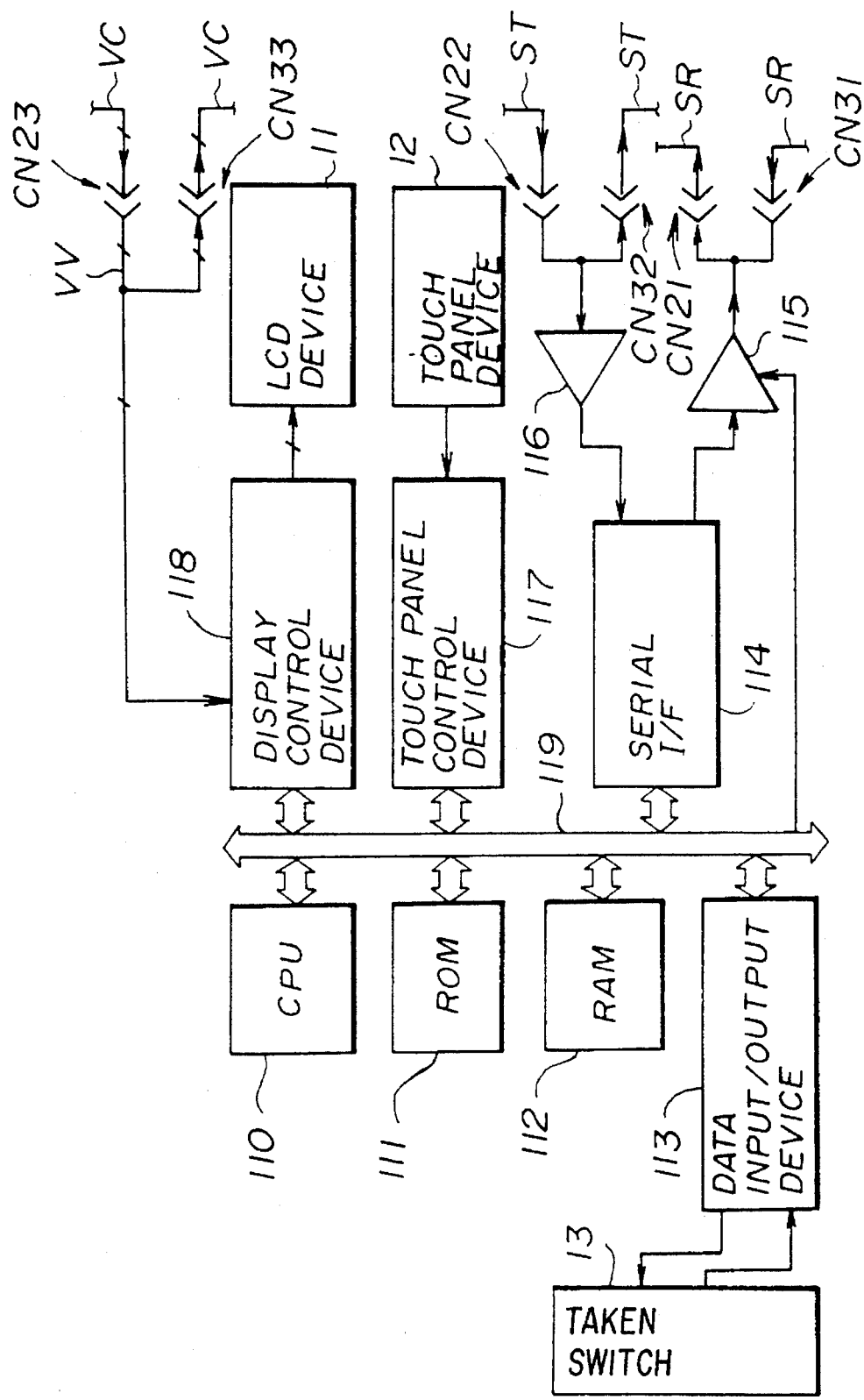
FIG. 15 shows a block construction of the slave apparatus according to the embodiment of the present invention.

The slave apparatus SL1 will now be described in detail with reference to FIG. 15. The other three slave apparatus SL2 to SL4 are identical to the slave apparatus SL1, and thus a description thereof is omitted.

A CPU (Central Processing Unit) 110 is used for processing and controlling each device in the slave apparatus SL1, and processing and controlling the data transmission function to be executed between the slave device SL1 and the master apparatus MR. A ROM (Read Only Memory) 111 is used for storing therein information including control programs to be executed by the CPU 110, and data such as various parameters to be used by the CPU 110 for executing the control programs. A RAM (Random Access Memory) 112 is used for forming a work area to be used by the CPU 110.

A data input/output device 113 is used for inputting a managing signal, obtained from the token switch 13 as a result of the token switch 13 being managed by a user, in the slave apparatus SL1. The data input/output device 113 also outputs a lighting signal to the token switch 13 so as to light (or to turn on) the light integrated in the token switch 13. The serial interface device 114 is used transmitting data, via the signal lines ST and SL, between the master apparatus MR and the slave apparatus SL1.

A signal output from the serial interface device 114 is then, via a driver device 115 and contacts of an output cable connector CN21, sent to the signal line SR. A signal received from the line ST is then, via an input cable connector CN22 and a receiver device 116, sent to the serial interface device 114.

A touch panel control device 117 is used for determining, based on a signal output from the touch panel device 12, a coordinate position input through the touch panel device 12, and for providing information associated with the determined input coordinate position. A display control device 118 is used for controlling a picture displayed through the LCD device 11. This controlling is executed based on the displaying signal VV provided from the signal line VC, via contacts CN 23 of an input cable connector, and sent to the signal line VC.

The CPU 110, ROM 111, RAM 112, serial data input/output device 113, interface device 114, touch panel control device 115, and display control device 118 are respectively coupled to an internal bus 119. Thus, data is transferred among the above devices mainly through the system bus 119.

Further, contacts CN31, CN32, and CN33 of output cable connectors for connecting the cable between the slave apparatus SL1 and the adjacent slave apparatus (in this case, SL2. Please refer to FIG. 1) are respectively connected to contacts CN21, CN22 and CN23 of input connectors.

Figure 16:
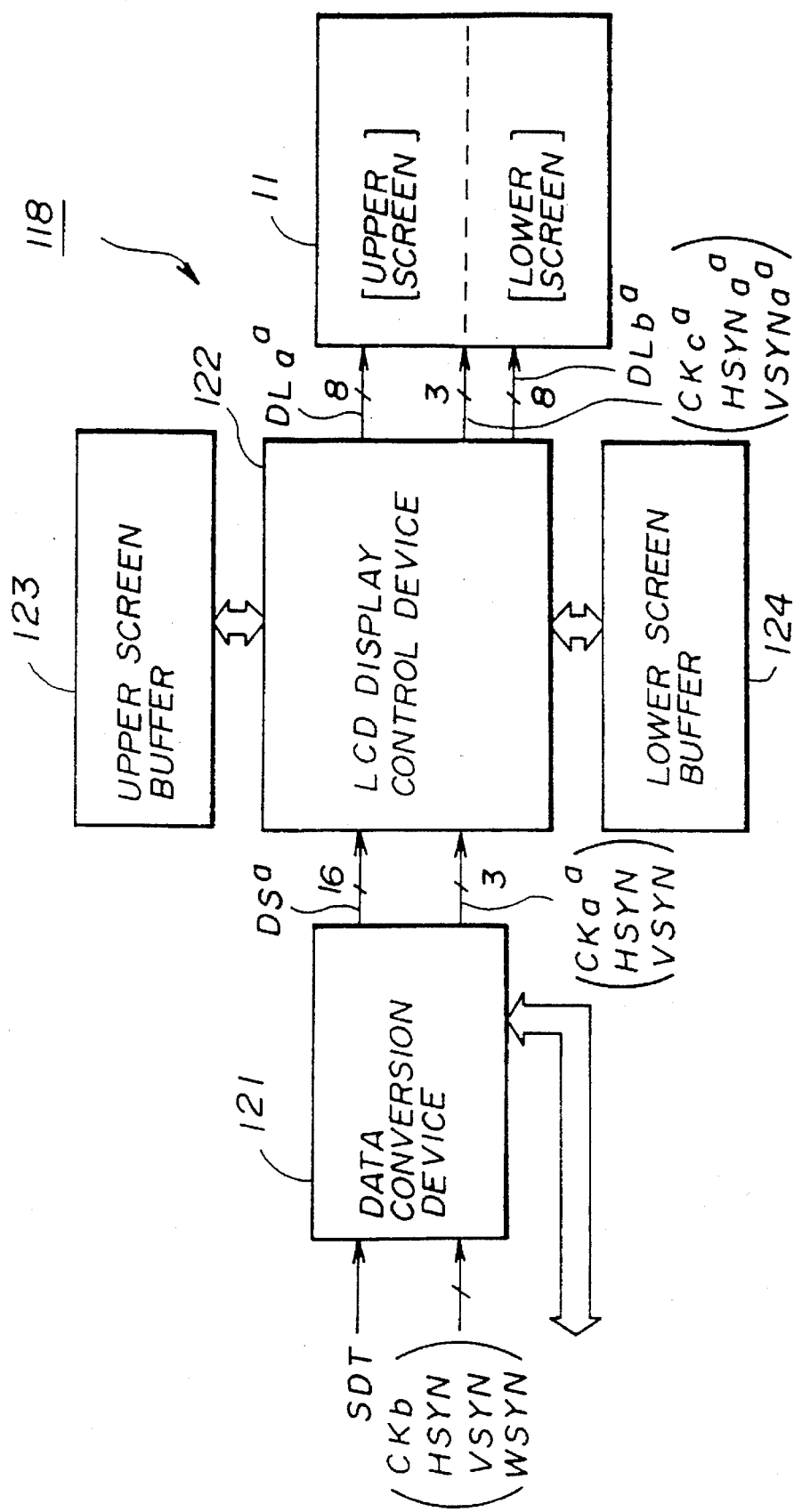
FIG. 16 shows a block construction of a communication control device in the slave apparatus according to the embodiment of the present invention.

An embodiment of the display control device 118 will now be described with reference to FIG. 16.

The serial displaying data SDT, transferring clock signal CKb, word synchronizing signal WSYN, horizontal synchronizing signal HSYN, and vertical synchronizing signal VSYN are sent to a data conversion device 121.

The data conversion device 121, in synchronization with the clock signal CKb, successively inputs the serial displaying data STD, and, in response to the word synchronizing signal WSYN, converts the input serial displaying data DS into the corresponding 16 bit parallel displaying data $DS^a$. The displaying data $DS^a$ is then sent to a liquid-crystal-display device display control device (LCD display control device) 122. Further, the data conversion device 121 generates a clock signal $CKa^a$ indicating an input timing of the displaying data $DS^a$. Then, the data conversion device 121 provides the generated clock signal $CKa^a$ as well as the input horizontal synchronizing signal HSYN and vertical synchronizing signal VSYN to the LCD display control device 122.

The LCD display control device 122 is substantially identical to the LCD display control device 62 in the master apparatus MR and the LCD device 11 is substantially identical to the LCD device 2 in the master apparatus MR. Thus, the screen refreshment frequency associated with the LCD device 11 is determined, based on its characteristics, to be 72 frames per 1 second. Further, the frequency of the clock signal $CKa^a$ to be used for transferring the displaying data $DS^a$ becomes 409.6 KHz.

The screen of the LCD device 11 is divided into two parts: an upper screen and a lower screen. An upper screen buffer 123 and lower screen buffer 124 are provided for the LCD display control device 122. The upper screen buffer 123 is used for temporarily storing the displaying data $DLa^a$ to be output through the upper screen and the lower screen buffer 124 is used for temporarily storing the displaying data $DLb^a$ to be output through the lower screen. The LCD display control device 122 respectively outputs the displaying data $DLa^a$ and $DLb^a$ stored in the respective buffers 123 and 124, as 8 bit parallel data, to the corresponding upper and lower screens of the screen of the LCD device 11.

Further, the frequency of a clock signal $CKc^a$ to be used for transferring the displaying data $DLa^a$ and $DLb^a$ from the LCD display control device 122 to the LCD device 11 should be 5.89824 MHz. Further, the frequency of a horizontal synchronizing signal $HSYNa^a$ indicating a starting timing of each line of the displaying data to be output from the LCD display control device 122 to the LCD device 11 should be 73.728 KHz. Furthermore, the frequency of a vertical synchronizing signal $VSYNa^a$ indicating a starting timing of each screen of the displaying data to be output from the LCD display control device 122 to the LCD device 11 should be 72 Hz.

Thus, the LCD display control device 122 successively inputs the displaying data $DS^a$ output from the data conversion device 121, in synchronization with the clock signal $CKa^a$, and counts pulses of the horizontal synchronizing signals HSYN. The LCD display control device 122 then stores the input displaying data $DS^a$ in an appropriate position in the upper screen buffer 123 until a number of the counted pulses of the horizontal synchronizing signal HSYN equals a predetermined number (640) of lines corresponding to the number of lines of the upper screen of the LCD device 11. The LCD display control device 112 then stores the input displaying data $DS^a$ in an appropriate position of the lower screen buffer 124 if the number of counted pulses of the horizontal synchronizing signals HSYN exceeds the predetermined number (640) of lines of the upper screen until a pulse of the vertical synchronizing signal VSYN has been input.

Then, the LCD display control device 122, while outputting the clock signal $CKc^a$ to the LCD device 11, successively, in synchronization with the clock signal $CKc^a$, reads the 8 bit data from both the upper screen buffer 123 and lower screen buffer 124, and provides the read 8 bit data, as respective data of the displaying data $DLa^a$ and $DLb^a$, to the LCD device 11. Further, the LCD display control device 122 outputs to the LCD device 11 the horizontal synchronizing signal $HSYNa^a$, the outputting being executed each time when each line of the displaying data $DS^a$ is started, and outputs the vertical synchronizing signal $VSYNa^a$, the outputting being executed each time wheel each screen of the displaying data $DS^a$ is started.

Since the data conversion device 68 in the master apparatus MR converts without delay the displaying data DS output from the VRAM 63 into the serial displaying data STD and then outputs the displaying signal VV, the displaying data $DS^a$, which is output by the data conversion device 121 in each of the four slave apparatus SL1 to SL4, has a corresponding delay time, with respect to the displaying data DS. This delay time corresponds to a time resulting from adding the delay time caused by a conversion operation executed in the data conversion device 68 and the data conversion device 122 to the delay time caused by carrying the signal via the cable (s) CL. However, as mentioned above, the screen renewal speed of the LCD devices 2 and 11, being 5 frames/second, is relatively slow, thus, in comparison with the screen renewal speed, the above delay time of the displaying data $DS^a$ with respect to the displaying data DS is negligibly small.

Thus, it can be said that the displaying data $DLa^a$ and $DLb^a$ which the LCD display control device 122 provides to the LCD device 11 in each of the four slave apparatus SL1 to SL4 are respectively generally identical to (have no time delay with respect to) the displaying data DLa and DLb which the LCD display control device 68 provides to the LCD device 2. Thus, it also can be said that respective users who see the LCD screens of the corresponding four slave apparatus SL1 to SL4 can generally see pictures identical to the one seen by a user who sees the LCD screen of the master apparatus MR.

Figure 17:
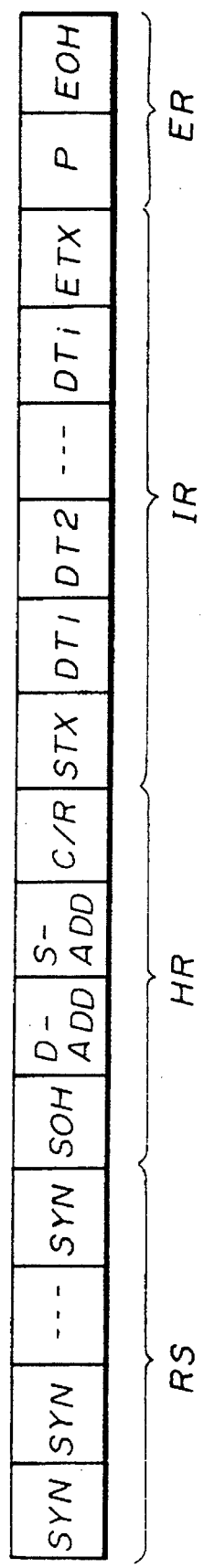
FIG. 17 shows a signal format associated with transmission data to be transmitted, via signal lines SR and ST, among a master apparatus MR and four slave apparatus SL1 to SL4 according to the embodiment of the present invention.

One example of a signal format associated with transmission data to be transmitted, via the signal lines SR and ST, among the master apparatus MR and the four slave apparatus SL1 to SL4 will now be described with reference to FIG. 17. The signal format used for data transmission associated with the start-stop synchronism system is basically applied to the above embodiment.

The transmission data of the embodiment comprises: a synchronizing part RS to be used for establishing a synchronization state of data, a header part HR to be used for specifying information including a destination of the transmission data, an information part IR to be used for carrying information to be transmitted, and a trail part ER indicating the end of the transmission data.

The synchronizing part RS comprises a series of k pieces of synchronizing signals SYN, each piece having a predetermined bit pattern. The header part HR comprises: data SOH indicating the beginning of the header part HR, destination address data D-ADD indicating the destination of the transmission data, sending-origin address data S-ADD indicating the sending origin of the transmission data, and control information data C/R indicating the type of the information part IR.

The information part IR comprises: data STX indicating the beginning of the information part IR, one or more than one of transmission word data DT1 (, . . . ), and data ETX indicating the end of the information part IR. The trail part ER comprises: parity bit P to be used for error detection and data EOH indicating the end of the trail part ER.

Each of the master apparatus and the four slave apparatus SL1 to SL4 has a respective predetermined specific address.

Figure 18:
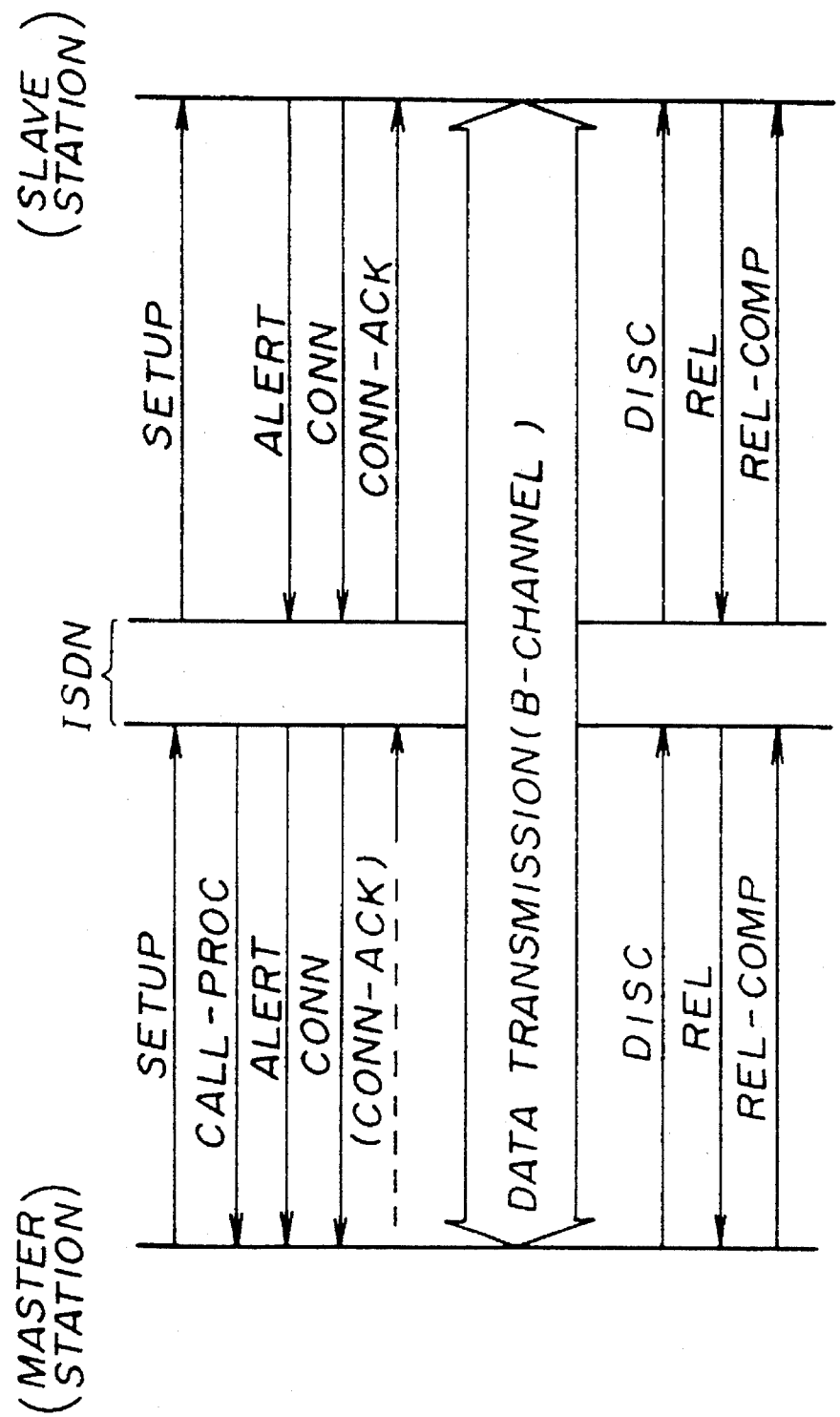
FIG. 18 shows call control time chart in telephone terminals using an ISDN according to the embodiment of the present invention.

One example of a calling control procedure employed when a telephone terminal function is realized using the ISDN will now be described with reference to FIG. 18.

A master station first sets a circuit switching mode to be used as a transferring mode, and then transmits, to the ISDN, a call set-up message SETUP having a specified address indicating a slave station, so as to request a call set-up with the slave station. Then, the ISDN calls the slave station by transmitting, to the specified slave station, the call set-up message SETUP. The ISDN further transmits, to the master station, a call-set-up reception message CALL_PROC for reporting the call-set-up state.

The slave station, after detecting the incoming call, when the slave station is in a state where the slave station can terminate for the detected incoming call, then transmits, to the ISDN, a calling message ALERT. Then, the ISDN transmits, to the master station, the calling message ALERT so as to report the beginning of the calling of the slave station.

The slave station, after the user has picked up the handset so as to respond to the calling, then transmits, to the ISDN, a response message CONN. The ISDN then transmits the response message CONN to the master station so as to report that the slave station has responded to the calling.

Further, the ISDN transmits a response acknowledgement message CONN-ACK to the slave station so as to acknowledge the response made by the slave station. Then, the B-channel to be used for data transmission (or speech) between the master station and the slave station is established. Thus, a speech operation may be performed desirably using the established B-channel between the user associated with the master station and the other user associated with the slave station.

Then, after the speech operation has been completed and the user of the master station has returned its handset and on-hooked, the master station transmits, to the ISDN, a disconnect message DISC so as to request release of the established B-channel. Then, the ISDN transmits the release message REL to the master station so as to report the release of the established B-channel. Further, the ISDN transmits the disconnect message DISC to the slave station so as to request the release of the established B-channel. Then, the slave station transmits the release message REL to the ISDN so as to report the release of the established B-channel.

Thus, in response to the above transmission, the master station transmits a release completion message REL-COMP to the ISDN so as to report the completion of channel-disconnection. Thus, the part of the established B-channel established between the master station and the ISDN is released. Further, the ISDN transmits the release completion massage REL-COMP to the slave station. Thus, the other part of the established B-channel established between the ISDN and the slave station is released. As a result, the established B-channel established between the master station and the slave station is completely released.

Summarizing the above, the B-channel is established between the master station and the slave station, then the data is transmitted between both stations, and then after the data transmission has been completed, the established B-channel is released.

Further, as shown in FIG. 19A, each message to be used for the call set-up in the ISDN comprises: a protocol identifier to be used for identifying a protocol specification (including a format and sequence) for defining the layer-3 call-control message, a call number to be used for identifying which call is associated with the message, a message type to be used for identifying contents of each message, mandatory information elements which it is mandatory to attach to each message, and an additional information element to be attached to each message as occasion demands. The number of the mandatory information elements to be attached to each message varies in a range of 0, 1, or a plural number, depending on the respective message types associated with the messages. The number of the additional information elements to be attached to each message varies in a range of 0, 1, or a plural number, depending on the corresponding conditions.

In the case where the message comprises the call set-up message SETUP, as shown in FIG. 19B, the call set-up message SETUP has, as the mandatory information element, "transmission ability" and has, as the additional information elements, "master number", "slave number", "subordinate layer matching property", "higher layer matching property" and "user-user".

Such information elements will now be generally described.

The "transmission ability" information element comprises information including: information concerning an information transferring ability indicating the contents of information to be transmitted, voice, unrestricted digital information, restricted digital information, 3.1 KHz audio, 7 KHz audio, or video; information concerning a transferring mode indicating a switching function to be used, a circuit switching function or a packet switching function; information concerning an information transferring speed indicating a transferring speed at which information is transferred; information indicating a transferring form (a channel connection method, that is, for example, a one station to another station connection method); and information indicating a protocol of user information.

The "master number" information element indicates the ISDN number associated with the master station, and the "slave number" information element indicates the ISDN number associated with the slave station.

The "subordinate layer matching property" information element is used for a communication-with-another-station possibility examination. The basic contents of the "subordinate layer matching property" information element are identical to those of the above "transmission ability" information element. Further, the contents of the "subordinate layer matching property" information element include further detail contents such as, for example, CCITT recommendation H. 221 function.

The "higher layer matching property" information element is used for a matching-with-another-station property examination and indicates which terminal function is provided, from among the following terminal functions concerning: for example, the telephone, group 2/group 3 facsimile, group 4 facsimile, mixed mode, teletex, videotex, telex, audio visual, message handling system, or still picture conference.

The "user-user" information element is used for transmitting information between users and the contents of the "user-user" information element are, without being previously interpreted by the ISDN, transparently transferred to the other user.

The master station first transmits, to the ISDN, a call set-up message SETUP having a specified address indicating an objective slave station, so as to request a call set-up with the objective slave station. Then, the ISDN transmits, to the master station, a call-set-up reception message CALL-PROC for reporting the call-set-up state. Further, the ISDN calls the specified slave station by transmitting, to the specified slave station, the call set-up message SETUP.

Figure 20:
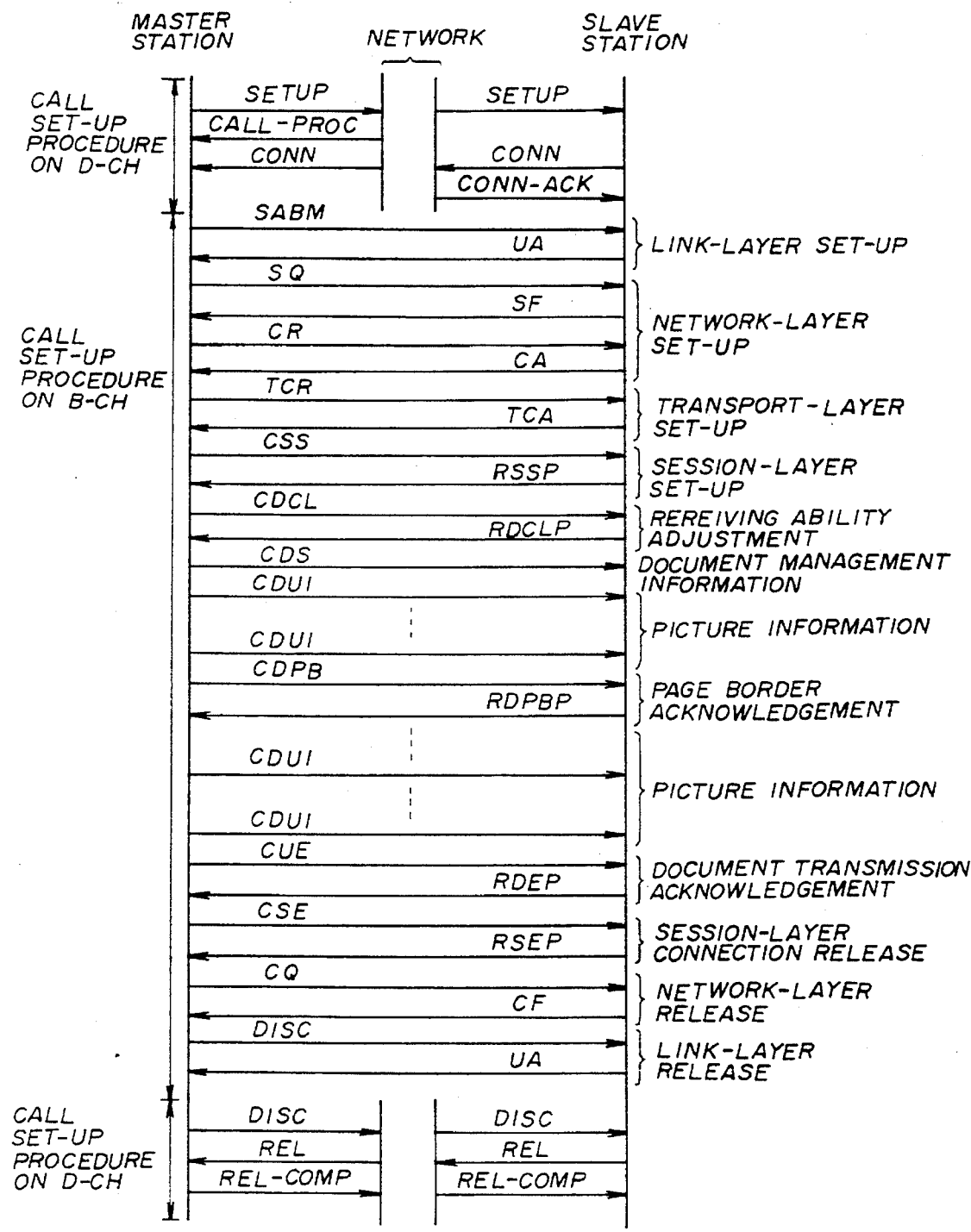
FIG. 20 shows an embodiment of a time chart of a transmission procedure of a group 4 facsimile apparatus using an ISDN according to the embodiment of the present invention.

One example of a transmission procedure applicable to the group-4-facsimile communication function will now be described with reference to FIG. 20.

The slave station, after responding to the call incoming, transmits the response message CONN to the ISDN. As a result, the ISDN transmits the response acknowledgement message CONN-ACK so as to acknowledge the response by the slave station. Then, the B-channel for data transmission is established between the master station and the slave station. Thus, the master and slave stations begin the transmission procedure on the established B-channel.

First, the master station transmits a command SABM so as to request a set-up of a link layer. In response to this, the slave station then transmits a response UA. Thus, the link layer is set-up.

Subsequently, the master station, so as to set-up a network layer end-to-end, transmits a signal SQ. The slave station then, so as to receive the signal, transmits a signal SF. Then, the master station transmits a signal CR so as to request an off-hook. In response to this, the slave station then transmits a signal CA so as to accept the call. Thus, the network layer is set-up.

Then, the master station, so as to set-up a transport layer, transmits a signal TCR. The slave station, in response to this, transmits a signal TCA. Thus, the transport layer is set-up.

Then, the master station, so as to set-up a connection of a session layer, transmits a session starting command CSS. In response to this, the slave station transmits a session starting permission response RSSP. Thus, the session layer is initiated.

Then, the master station, so as to execute negotiation as to a transmission function to be used, transmits a document-function-list command CDCL. The slave station then transmits a document-function-list permission response RDLP. Thus, a receiving ability is adjusted.

Then, after completion of the preparation for the picture information transmission, the master station transmits, following the transmission of a document starting command CDS (including various information items to be used for managing document information items to be transmitted, these various information including a document reference number to be used for distinguishing a document to be transmitted), an amount of picture information, which amount corresponds to one document, the transmission of the picture information being executed using a plurality of document-user-information commands CDUI. Then, after the completion of the above transmission, the master station transmits a document end command CDE so as to report an end of the transmission of one document of the picture information.

The slave station, after receiving the document end command CDE, then transmits a document end permission response RDEP indicating that the document has been normally received.

if a plurality of pages are included in one document, the master station transmits a document-page-border command CDPB. This command CDPB indicates an end of one page. The transmission is executed each time when transmission of each page, excepting the time of the last page's transmission. The slave station transmits a document-page-border permission response RDPBP which indicates one page of the picture information has been normally received.

Thus, after the completion of the transmission of the amount of the picture-information-transmission for one document, the master station transmits a session end command CSE. Then, the slave station transmits a session end permission response RSEP. Thus, the connection of the session layer is released.

Then, the master station transmits a signal CQ associated with the network layer and in response to this, the slave station then transmits a signal CR, so that the network layer is released. Then, the master station transmits a command DISC associated with the link layer and the slave station then transmits a response UA, so that the link layer is released.

Thus, after the link (call) on the B-channel has been released, the master station then transmits a disconnect message DISC to the ISDN so as to request release of the B-channel. The ISDN then transmits a release message REL to the master station so as to report the release of the B-channel. Further, the ISDN transmits, to the slave station, the disconnect message DISC so as to request the release of the B-channel. Then, the slave station transmits the release message REL to the ISDN so as to report the release of the B-channel.

Then, in response to the above transmission, the master station transmits a release completion message REL-COMP to the ISDN so as to report the completion of channel-disconnection. Thus, the part of the established B-channel established between the master station and the ISDN is released. Further, the ISDN transmits the release completion message REL-COMP to the slave station. Thus, the other part of the established B-channel established between the ISDN and the slave station is released. As a result, the established B-channel established between the master station and the slave station is completely released.

Summarizing the above, the B-channel is established between the master station and the slave station, then the data is transmitted between both stations, and then after the data transmission has been finished, the established B-channel is released.

Further, in the case where the still-picture-conference apparatus function is realized using the B-channel, data transmission is executed using the multi-frame method specified in the TTC standard JT-H. 221 (Japanese Standard corresponding to CCITT recommendation H. 221).

Figure 21:
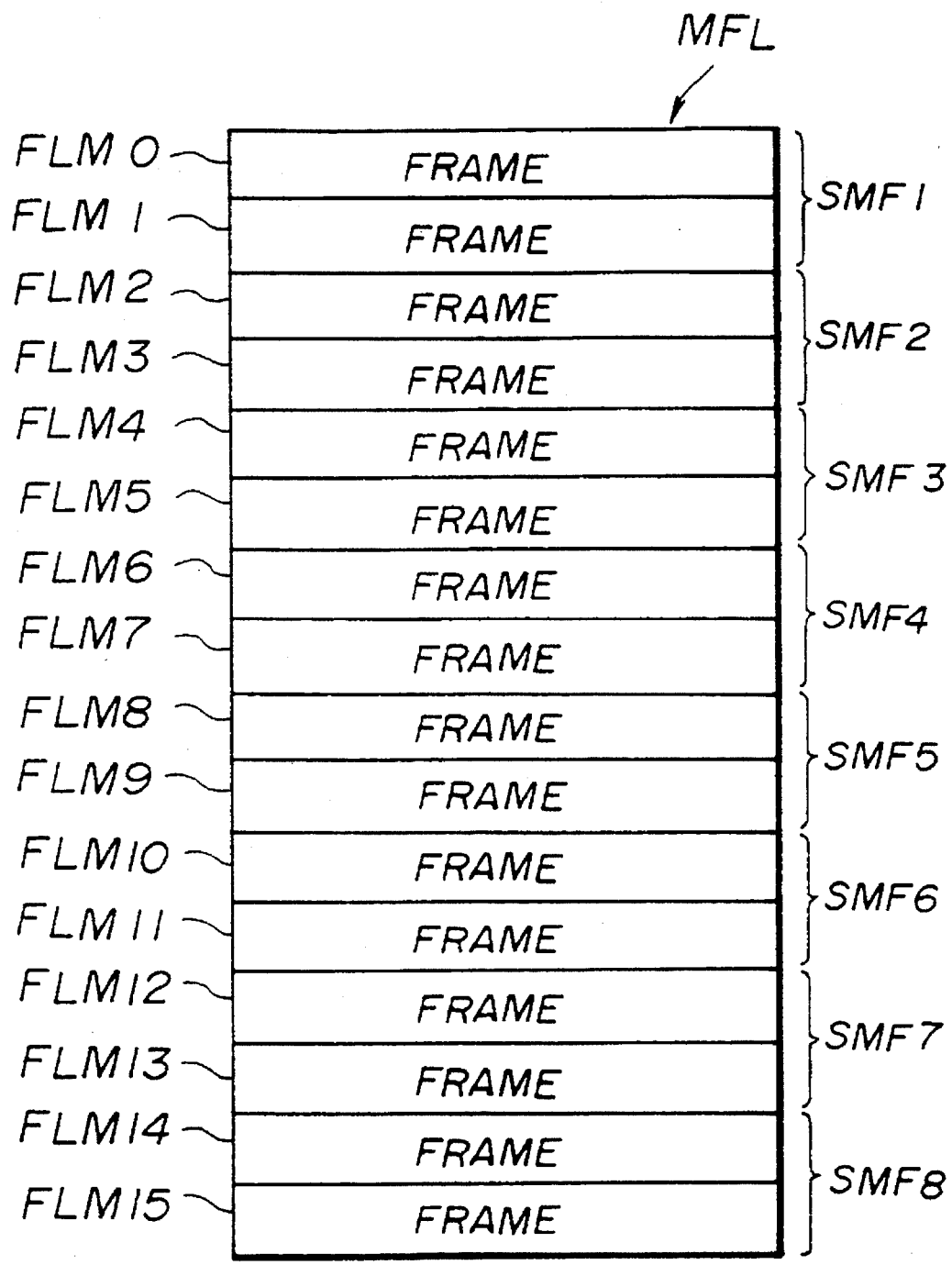
FIG. 21 shows a frame construction of a multi-frame according to the embodiment of the present invention.
Figure 22:
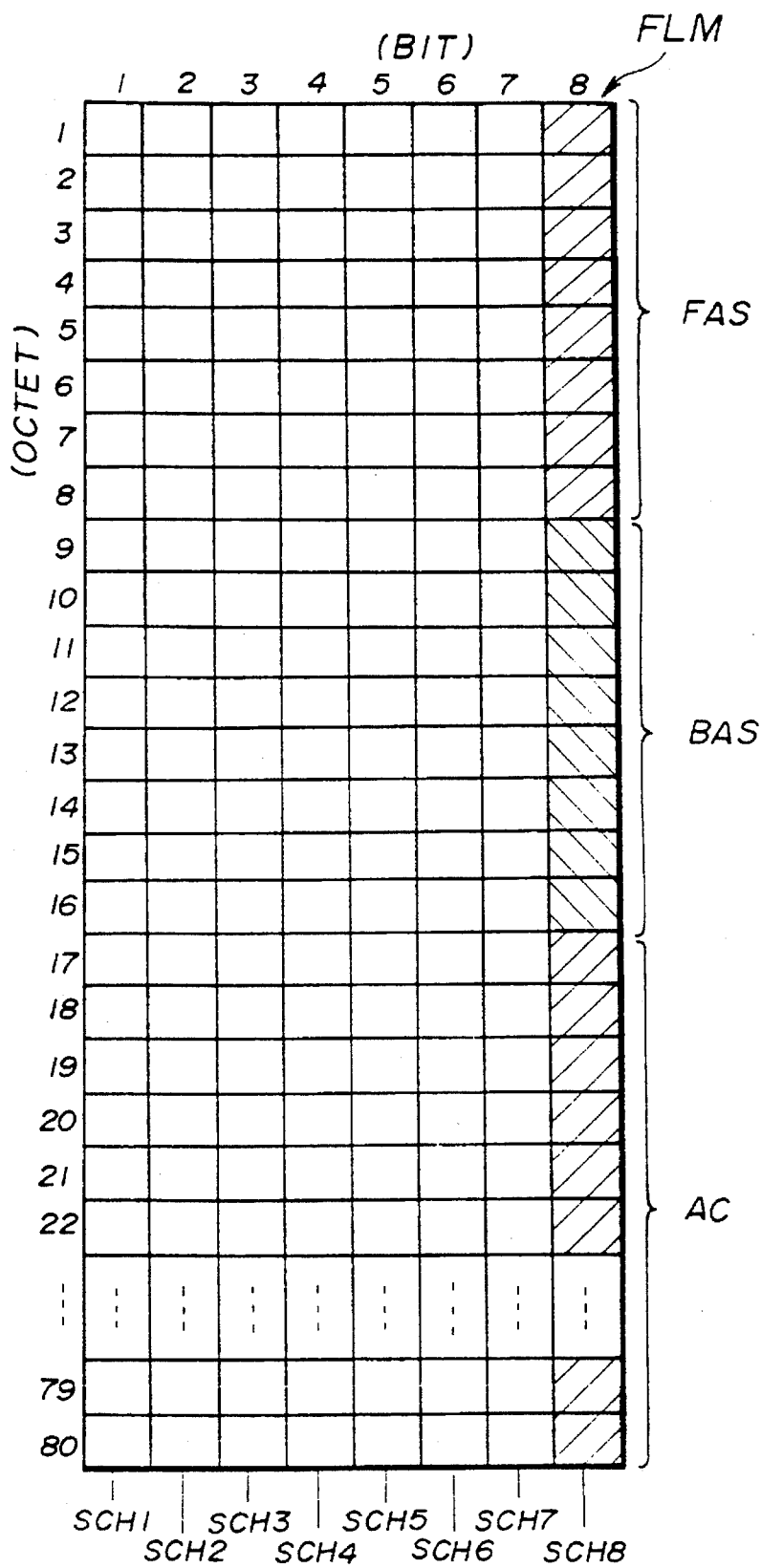
FIG. 22 shows a signal construction of a frame according to the embodiment of the present invention.

As shown in FIG. 21, one multi-frame comprises 8 sub-multi-frames SMF1 to SMF8 and each of the sub-multi-frames SMF1 to SMF8 comprises two frames. That is, one multi-frame comprises 16 frames FLM0 to FLM15.

Each of the frames FLM0 to FLM15 comprises 80 octet (each comprising 8 bits) of data. Respective bits located in each bit position (vertical row) of the octets constitute corresponding sub-channels SCH1 to SCH8.

Further, the 8th bits of the first to the eighth octets constitute a frame alignment signal FAS, while the 8th bits of the ninth to the sixteenth octets constitute a bit rate allocation signal BAS. That is, the sub-channel SCH8 is allocated to the 8th bits of the remaining seventeenth to eightieth octets. These allocated bits may be called an application channel AC. Further, a cipher channel, which is to be used for transmitting/receiving of key information to be used for enciphering data, may be set (optionally) on the seventeenth to twenty-fourth octets of the sub-channel SCH8.

Thus, 8 bits of the frame alignment (synchronizing) signal FAS are provided for each of the frames FLM0 to FLM15. A bit allocation to these bits is predetermined as a one unit comprises a one multi-frame MFL, as shown in FIG. 23.

That is, a horizontal synchronizing signal comprising 8 bits of data pattern "00110111" is allocated to the second to the eighth octets of each of the even frames FLM0, FLM2, ..., FLM14, and to the second octet (which second octet follows the eighth octet of the even frame located just above) of each of the odd frames FLM1, FLM3, ..., FLM15. Further, a vertical synchronizing signal comprising 6 bits of data pattern "001011" is allocated to the first octet of the odd frames FLM1, FLM3, ..., FLM11.

Detection of these horizontal synchronizing signals and vertical synchronizing signals enables synchronization of the corresponding multi-frame MFL to be detected.

Further, bits N1, N2, N3, N4, and N5 respectively located in the first octets of the 0th frame, second frame, 4th frame, 6th frame, and 8th frame are used for indicating a multi-frame number. The bit N5 therein is used for indicating whether or not the multi-frame number is used. Thus, since a data length to be used for indicating the multi-frame number comprises the 4 bits N1 to N4, the multi-frame number may be selected from among the 16 numbers 0 to 15. The multi-frame number is successively determined in a manner of number-decreasing order (that is, for example, the number "14" is allocated next of the number 15 having been allocated) and thus the same number occurs each time when the multi-frame numbers of each 16 multi-frames are determined.

Further, bits L1, L2 and L3 located respectively at the first octets of the 10th frame, 12th frame and 13th frame are used for indicating a connection number, which number indicates a sequence in which the B-channel has been connected, which B-channel is among the currently used B-channels and carries these frames. The bit R located at the first octet of the 15th frame is provided so as that, in future, it may be used for a new recommendation and value "0" is set therein.

A bit TEA located at the first octet of the 14th frame is used for indicating a state of the data station apparatus, in which state, due to an internal obstruction, data transmission can not be executed.

Bits A, respectively located at third octets of the odd frames FLM1, FLM3, ..., FLM15, are used for indicating whether a frame synchronization or a multi-frame synchronization has been established, or is not established.

The bits C1, C2, C3, and C4 respectively located at the 5th octets, 6th octets, 7th octets and 8th octets of the odd frames FLM1, FLM3, ..., FLM15 are used for indicating a CRC (cyclic redundancy check) code, which code is referred to for detecting data error in two successive frames (that is, a sub-multi-frame). Bits E, respectively located at the 4th octets of these odd frames FLM1, FLM3, ..., FLM15 are used for indicating detection of a transmission error at the receiving side.

Figures 24, 25:
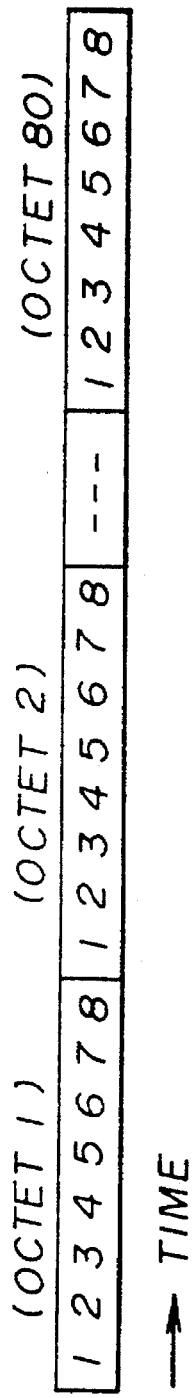
FIG. 24 shows a bit allocation signal according to the embodiment of the present invention.
FIG. 25 shows of an order in which signals are transmitted according to the embodiment of the present invention.

Further, the bit rate allocating signal BAS has, as shown in FIG. 24, in the case of the BAS associated with each of the even frames FLM0, FLM2, ..., FLM14, 8 bits of data indicating ability BAS or BAS command, and the BAS has, in the case of the BAS associated with a respective one of the odd frames FLM1, FLM3, ..., FLM15 respectively following the above even frames, a double-error-correction code to be used for correcting an error included in the ability BAS or BAS command which has been transmitted with the just preceding frame.

Further, the data transmission of the multi-frame MFL is executed according to the order of the frame numbers, and each of the frames FLM0 to FLM15 is transmitted, as shown in FIG. 25, according to the order of the octet numbers, from the first octet to the 80th octet. Each octet is transmitted so that the first bit thereof is transmitted first.

That is, in each of the frames FLM0 to FLM15, the first bit of the first octet is transmitted first and the 8th bit of the 80th octet is transmitted last.

Figure 26A:
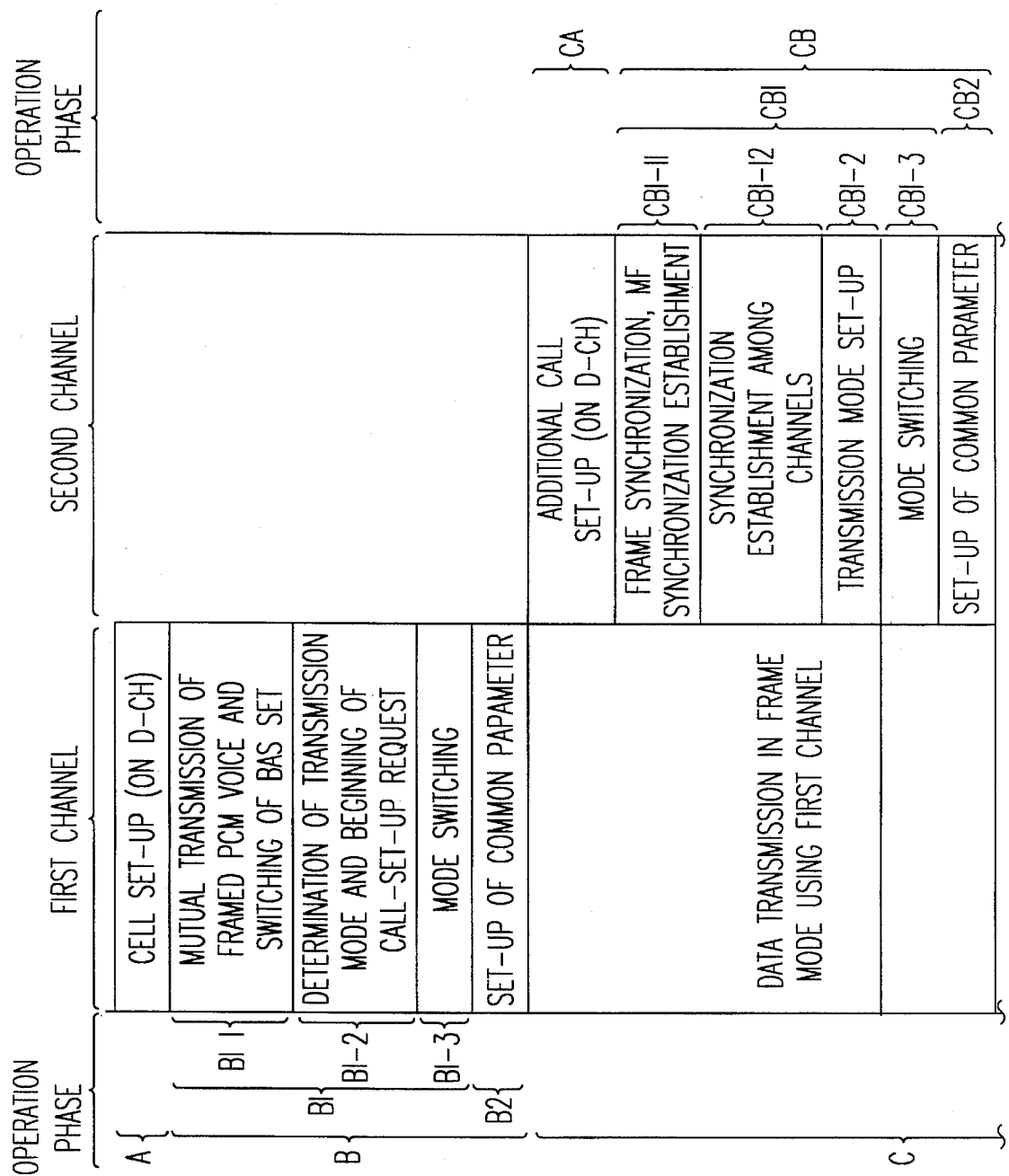
FIG. 26 shows a time chart of the general procedure according to the TTC standard JT-H. 242 (Japanese Standard corresponding to CCITT recommendation H.L 242) applicable to the embodiment of the present invention.
Figure 26B:
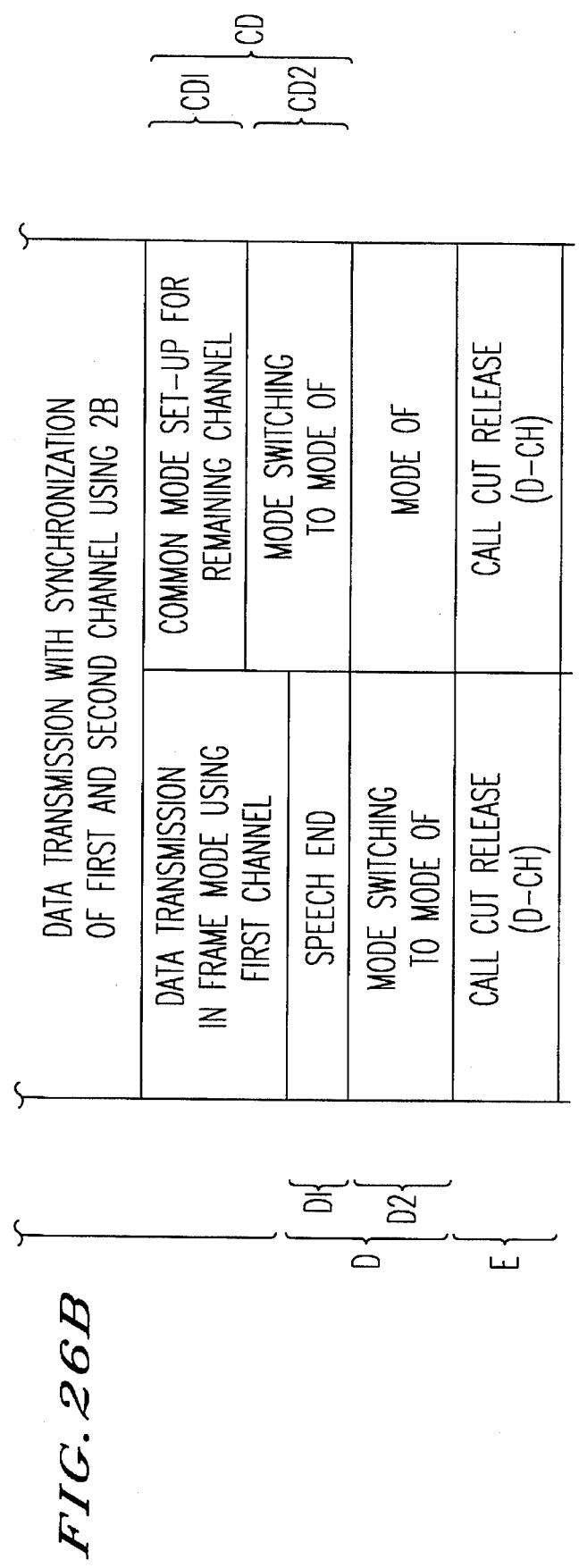

An example of the general procedure according to the TTC standard JT-H. 242 (Japanese Standard corresponding to CCITT recommendation H.L 242), which standard is applied as a transmission control procedure executed when the data is transmitted by the still picture conference apparatus, the data being transmitted through the B-channel, will now be described with reference to FIG. 26. In this example, voice data and moving-picture data is transmitted between the stations, the data being transmitted through the two B-channels.

First, a master station calls an objective slave station and then executes a call set-up procedure on the D-channel, so as to obtain the B-channel (this channel will be referred to as the "first channel", hereinafter) (phase A). Then, the master station, while transmitting/receiving, on the obtained first channel, the frame data which has a PCM voice data (A-law, or μ-law, 64 Kbps) set therein, executes frame synchronizing (frame mode). Then, after the frame synchronization has been established, the main station transmits/receives both the ability BAS and the command BAS (phase B1-1) with the slave station. Thus, a transmission mode to be used is determined. Then, the master station starts an additional call-set-up request so as to obtain the second B-channel (phase B1-2).

Then, according to the contents which have been transmitted/received between the master and slave stations, the master station selects the transmission mode, which is, in principle, a mode which is common to both stations and capable of the highest performance (phase B1-3). Then the master station transmits the BAS command specifying a terminal function so that the slave station may execute an appropriate function according to the selected operation (transmission) mode, and next parameters common to apparatus functions of both the master station and the slave station are set-up (phase B2). Thus, using the first channel, such functions as, for example, data transmission of voice data (16 Kbps) and data transmission of a moving picture data (46.4 Kbps) corresponding to the selected transmission mode (phase C) are executed.

Then, after the data transmission using the first channel has been started in the frame mode, the call set-up procedure is executed in the second B-channel (phase CA). Then, after the second channel has thus been established, the established second channel is used for transmission/receiving of the frame signal including only the frame alignment signal FAS and the bit allocation signal BAS so that the frame synchronization and the multi-frame synchronization are thus established (phase CB1-21). Then, synchronization between the first and second channels is established (phase CB1-12).

Then, after synchronization between the B-channels has been established, the data transmission is executed in a condition where the frame data transmitted/received using the first channel and the other frame data transmitted/received using the second channel are synchronized, both of the B-channels being used for transmitting the data. The data to be transmitted includes the voice data to which transmission capacity 48 Kbps is assigned and the moving picture data to which the transmission capacity 76.8 Kbps.

Then, in a case where such data transmission is to be terminated, first the second channel is cut. Then, for execution of the voice data transmission using only the first channel, a procedure to set-up a common mode is executed (phase CD1). Then, mode switching to a mode 0F is executed in the second channel (phase CD2). At this time, the condition is such that the first and second channels are not synchronized with each other, and the call is kept in the second channel in a transmission condition only with the frame alignment signal FAS and the bit allocation signal BAS. This condition is such that a D-channel's call-cut-and-release procedure releases the call of the second channel.

Further, in the first channel, between the phases CD1 and CD2, the voice data and moving-picture data are transmitted in total 62.4 Kbps of the transmission capacity. Further, in a case where the operator associated with one of the master and slave stations terminates the speech, then the moving-picture data is terminated. Then, to use, for the voice data transmission, all the capacity of the first channel including the capacity required for the moving-picture data transmission, the mode is then switched to 0F mode (phase D2). After this, the condition in such that execution of the D-channel's call-cut-and-release procedure releases the call of the first channel.

Thus, the call-cut-and-release procedure is executed for both the first and second channels (phase E), and then the audiovisual transmission between the two stations is terminated.

Summarizing the above, in the still-picture-conference apparatus, first the (first) B-channel is obtained and then the frame mode is established. Then, the assignment of the transmission capacities associated with the voice data and the moving-picture data is executed so that the data transmission is executed in a transitional mode such as mentioned above. Simultaneously, if it is possible for both of the stations to set-up the second channel, then the second channel is obtained by executing the D-channel's call-set-up procedure. Then, the first channel is synchronized with the second channel, through which first channel the data has been transmitted in the transitional mode and which second channel has been newly obtained as mentioned above. Then, when the between-channels synchronization has been established, the transmission capacities once-assigned to the voice data and the moving-picture data are assigned again. Then, in order to effectively utilize the increased (from only the first channel to both the first and second channels) transmission capacity of the B-channels, the coding rule (coding system) associated with the voice data and moving-picture data is modified, so that a more effective and thus higher quality of data transmission of the voice data and moving-picture data can be realized.

If the data transmission is to be terminated, it is necessary to change the mode being used (called a first model from the first mode to a second mode. In the first mode the transmission circuit comprising both the first and second channels synchronized with each other is used, while in the second mode only the first channel is used. The coding rules applied to the voice data and the moving-picture data in the using-two-channels mode are modified so that the modified coding rules become optimum for the first channel having the transmission capacity of 62.4 Kbps, and so as to modify the transmission mode to the only-first-channel mode. Simultaneously, the synchronization of the second channel with the first channel is terminated, and the mode associated with the second channel is changed to the mode 0F in which the user data is in a vacant transmission state. Then, the call in the second channel is cut by executing the D-channel's call-cut-and-release procedure. Further, in the first channel, the mode is changed from the two-type-media transmission mode where, for example, both the voice data and the moving-picture data are transmitted, to the 0F mode such as only-voice-data transmission. Then, the call of the first channel is cut/released by execution of the D-channel's cut-and-release procedure. In the first channel, it is also possible, instead of changing the mode to the above mentioned two-type-media transmission mode where, for example, the voice data and the moving-picture data are transmitted, to change the mode to the 0F mode directly, the call then being cut/released. Further, information including accounting information obtained during the call-cut-and-release procedure is managed for each channel.

Figure 27:
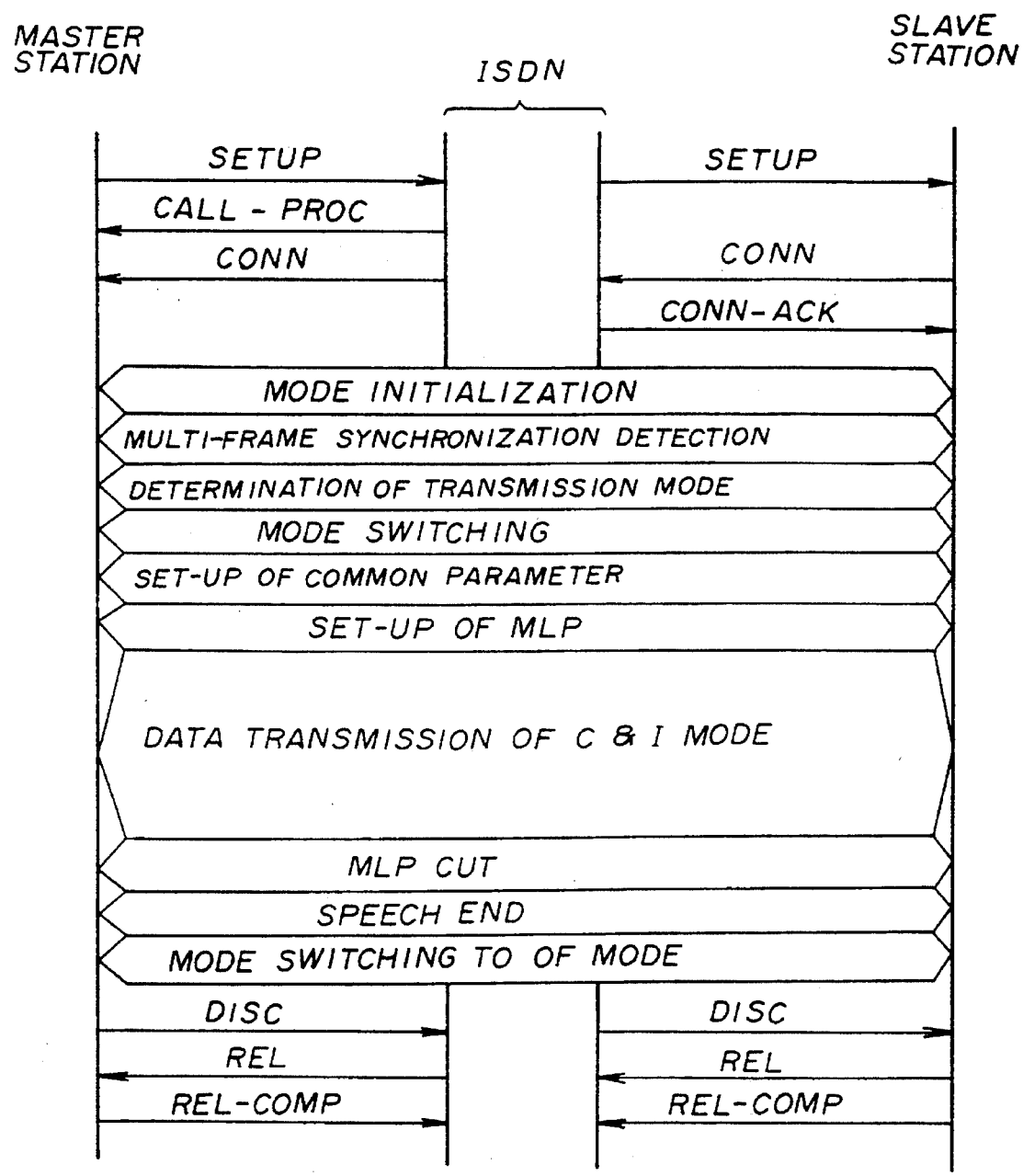
FIG. 27 shows a time chart of a transmission procedure executed in the still-picture-conference apparatus (the master apparatus and the four slave apparatus) according to the embodiment of the present invention.

Generally speaking, in the still-picture-conference apparatus, the data is transmitted through only one B-channel. An embodiment of such a method will now be described with reference to FIG. 27.

First, in order to call an objective slave station, a master station transmits the call set-up message SETUP, in which message unrestricted digital information is set in the "transmission ability" information element, the ISDN address of the master station is set in the "master number" information element, the ISDN address of the objective slave station is set in the "slave number" information element, the H. 221 function is set in the "subordinate-layer matching property" information element, and the still-picture-conference function is set in the "higher-layer matching property" information element. Then, the call set-up operation is executed respectively between the master station and the ISDN and between the ISDN and the slave station. As a result, the B-channel is established respectively between the master station and the ISDN and between the ISDN and the slave station. Thus, a communication path between the master station and the slave station is established.

Then, while the frame data in which data the PCM voice data has been set, is transmitted/received, on the established B-channel, the frame synchronization is executed (mode initialization). Then, after the frame synchronization and the multi-frame synchronization have been thus established (multi-frame synchronization detection), both the ability BAS data and the command BAS data are transmitted/received so that the transmission mode to be used is determined (determination of the transmission mode). In this case, the transmission mode for 56 Kbps of the voice data and the 6.4 Kbps of (general purpose) data is set-up. This general-purpose-data channel is used for transmitting/receiving of the below described C & I mode's data other than the voice data, the C & I mode's data including data concerning, for example, a C & I function, the tele-writing communication function, and a bulk-transferring function.

Then, the BAS command is transmitted from the master station to the slave station, which BAS command specifies the above selected transmission mode. Thus, the transmission mode between the master and slave stations is changed accordingly (mode change). Then, parameters common to the apparatus functions associated with both of the stations are set-up (common parameters set-up), which common parameters includes a cipher mode. Further, use of the general-purpose data according to MLP (multi-layer protocol) is set-up (MLP set-up). Then, the still-picture-conference mode to be used is set-up. Then, the data transmission is executed in the C & I mode.

(In the specification, please note that, the terms "master station" and "slave station" do not always respectively refer to the "master apparatus" MR and "slave apparatus" SL1 to SL4).

Then, after the C & I mode's data transmission has been terminated, the MLP is cut and then the speech operation is terminated. Then, after the transmission mode has been changed to the mode 0F, cutting/releasing of the D-channel is executed and then the series of still-picture-conference communication operations is terminated.

Further, in the C & I mode's data transmission, the following conference operation is executed.

First, an appropriate conference mode is selected from among the following four modes:

(a) a chairman mode in which the chairman specifies a next operator;

(b) an operator-specifying mode in which the current operator specifies a next operator;

(c) a participant-specifying mode in which an operation request having occurred from one of the participants, when the token has been kept by another participant, is once registered to a list, and then, after the token has been released, the registered participant gets the token; and (d) a free mode in which an operation right (token) is not determined.

Then, the conference proceeds as the following operations occur: "conference beginning request", "present/absent check", "calling request", "taking-conference information-out request", "conference state-displaying request". Then, the tele-writing application is started and the situation of the conference is changed to another situation in which participants refer to a common document.

In the tele-writing application, the following operations can occur as occasion demands; "requesting, taking-out and abandoning of an operation right for a document", "the operation right moving request", "document list request", "document taking-out request", "document storing request", "document deleting request", and "document recording request".

Further, "withdrawal/participation request", and "withdrawal permission request" occur as occasion demands, and in a case where "conference termination request" occurs, the C & I mode's data transmission is then terminated.

Instead of the above-mentioned conference-communication example using only one B-channel, both of the B-channels can be used for the conference-communication. In this case, it is possible to transmit/receive the moving-picture information using video-input/output ports provided optionally in the multiplication/separation device 47.

Figure 28:
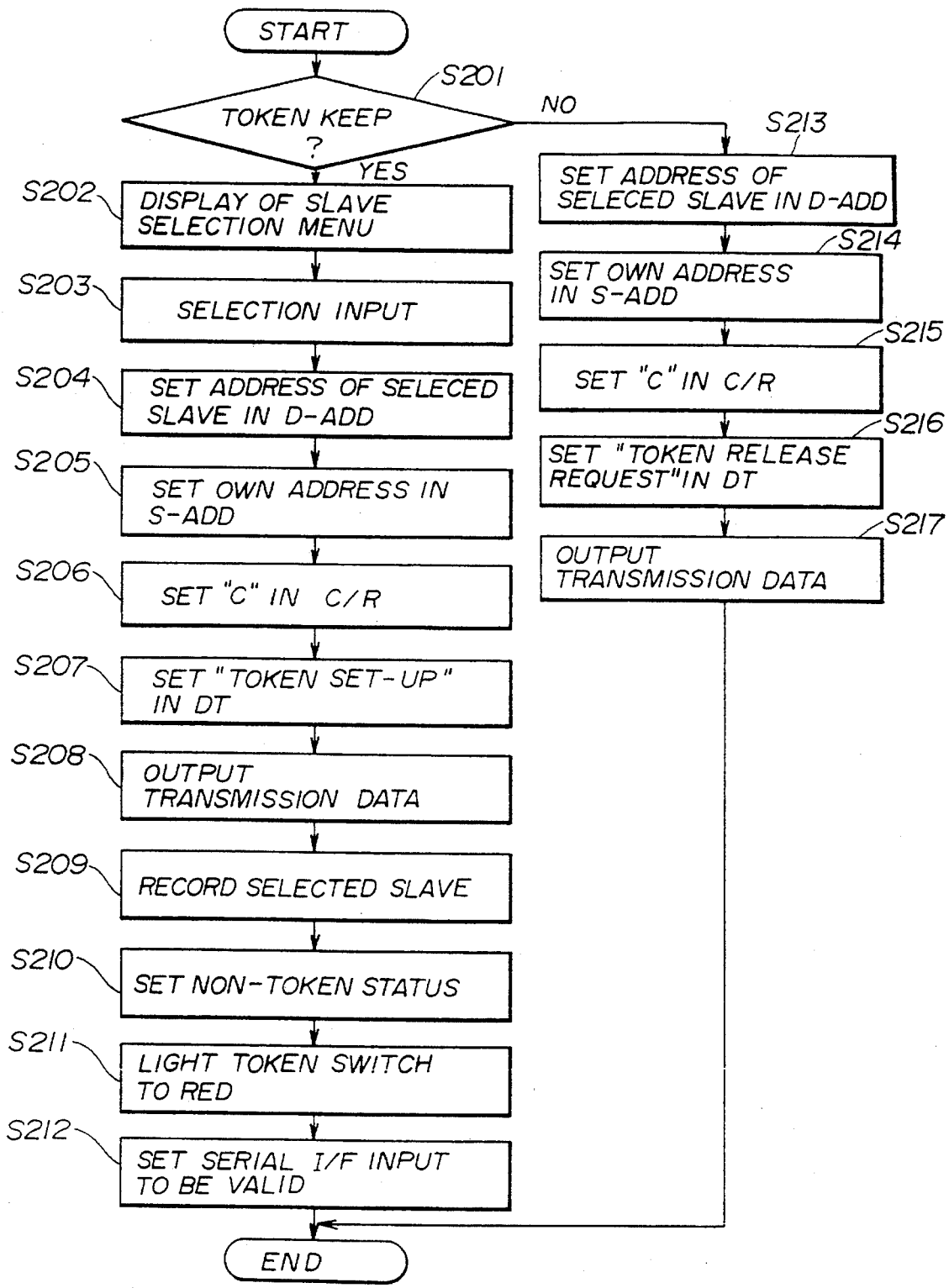
FIG. 28 shows an operation flow chart which the master apparatus executes after a token switch is managed during a still-picture-conference communication according to the embodiment of the present invention.

One example of the operation which the master apparatus MR executes when the token switch has been managed during the execution of the still-picture-conference communication will now be described with reference to FIG. 28.

In a step S201 (hereinafter, the term "step" will be omitted so that "S201" will mean "step S201", for example), it is determined whether or not the state of a token keep state. If the result of the S201 is YES, a slave selection menu is displayed so that the user may select which slave apparatus, from among the four slave apparatus SL1 to SL4, the token is to be set on in S202. Then, in S203, the user inputs the data on the selection of the slave apparatus SL1, SL2, SL3, or SL4. In the display of the slave apparatus, the data may be displayed in various ways, for example, identification names respectively associated with the four slave apparatus SL1 to SL4 may be listed thereon.

After the user has completed the selection, the data in the transmission data is set as follows: in S204, an address of the selected slave apparatus is set in the destination address data D-ADD; in S205, the master apparatus' address is set in the transmission origin address data S-ADD; in S206, data indicating "command" is set in the control information data C/R; in S207, data indicating "token set" is set in the transmission word data DT. Then, in S208, the transmission data, formed as described above, is output to the signal line ST.

Then, after the data has been transmitted the address of the selected slave apparatus is stored, in S209. Then in S210, a non-token state is set as the master apparatus MR's state, and in S211, the read light of the token switch 7 (shown in FIG. 14) is lit so that the non-token state is reported to the user.

Then, in S212, the signal input to the pointing-device processing device 98 (shown in FIG. 14) is set to be in an invalid state and the signal input to the pointing-device processing device 100 (shown in FIG. 14) is set to be in a valid state. Thus, the coordinate signal output from the selective slave apparatus and input through the serial interface device 31 (shown in FIG. 14) is set to be in a valid state, the current flow of the operation thus being completed.

On the other hand, in a case where the result of the S201 is NO, that is, this case being the case of a non-token state having been set, then the data in the transmission data is set as follows: in S213, the contents of the selected slave address are set in the destination address data D-ADD; in S214, the master apparatus' address is set in the transmission origin address data S-ADD; in S215, data indicating "command" is set in the control information data C/R; in S216, data indicating "token release request" is set in the transmission word data DT. Then, in S217, the transmission data, formed as described above, is output to the signal line ST.

Figure 29:
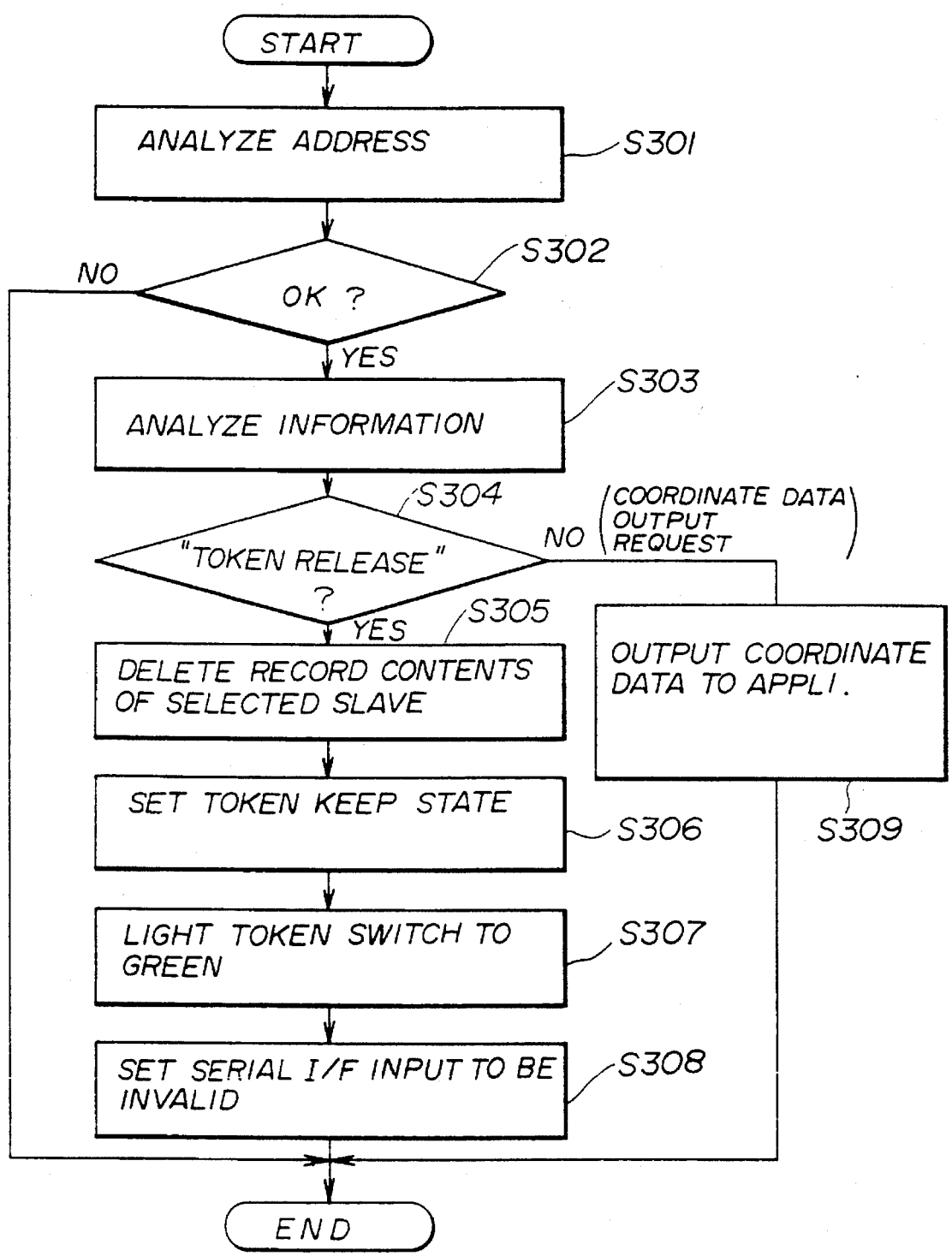
FIG. 29 shows an operation flow chart which the master apparatus executes after the master apparatus receives, via a signal line SR, transmission data during a still-picture-conference communication according to the embodiment of the present invention.

One example of the operation flow which the master apparatus MR executes when, during execution of the still-picture-conference communication, the transmission data is received via the signal line SR, will now be described with reference to FIG. 29.

First, in S301, the destination address data D-ADD and the transmission origin address data S-ADD of the received transmission data are analyzed. Then, in S302, it is determined whether or not the master apparatus' address has been set in the analyzed destination address data D-ADD and whether or not the analyzed transmission origin address data S-ADD is identical to the previously stored selected slave address. Then, in a case where the result of S302 is NO, the current received data is ignored.

If the result of S302 is YES the contents of the information part IR of the received data are analyzed, in S303. Then, in S304, it is determined whether or not the first transmission word data DT of the analyzed information part IR indicates "token release".

If the result of S304 is YES, in S305, the currently stored contents of the selected slave address are deleted, then, in S306, the token keep state is set as the master apparatus' state, and in S307, the green light of the token switch is lit so that the user may be informed that the master apparatus' state is now in the token existing state.

Then, in S308, the signal input to the pointing-device processing device 98 (shown in FIG. 14) is set to be in a valid state and the signal input to the pointing-device processing device 100 (shown in FIG. 14) is set to be in an invalid state. Thus, the coordinate signal input through the serial interface device 31 (shown in FIG. 14) is set to be in an invalid state, the current flow of the operation thus being completed.

Further, in a case where the first transmission word data DT of the information part IR contains "coordinate data output request" and where the result of the S304 is NO, then, in S309, coordinate data indicated by the with contents of the remaining transmission word data DT of the information part IR is output to the application being currently executed.

Figure 30:
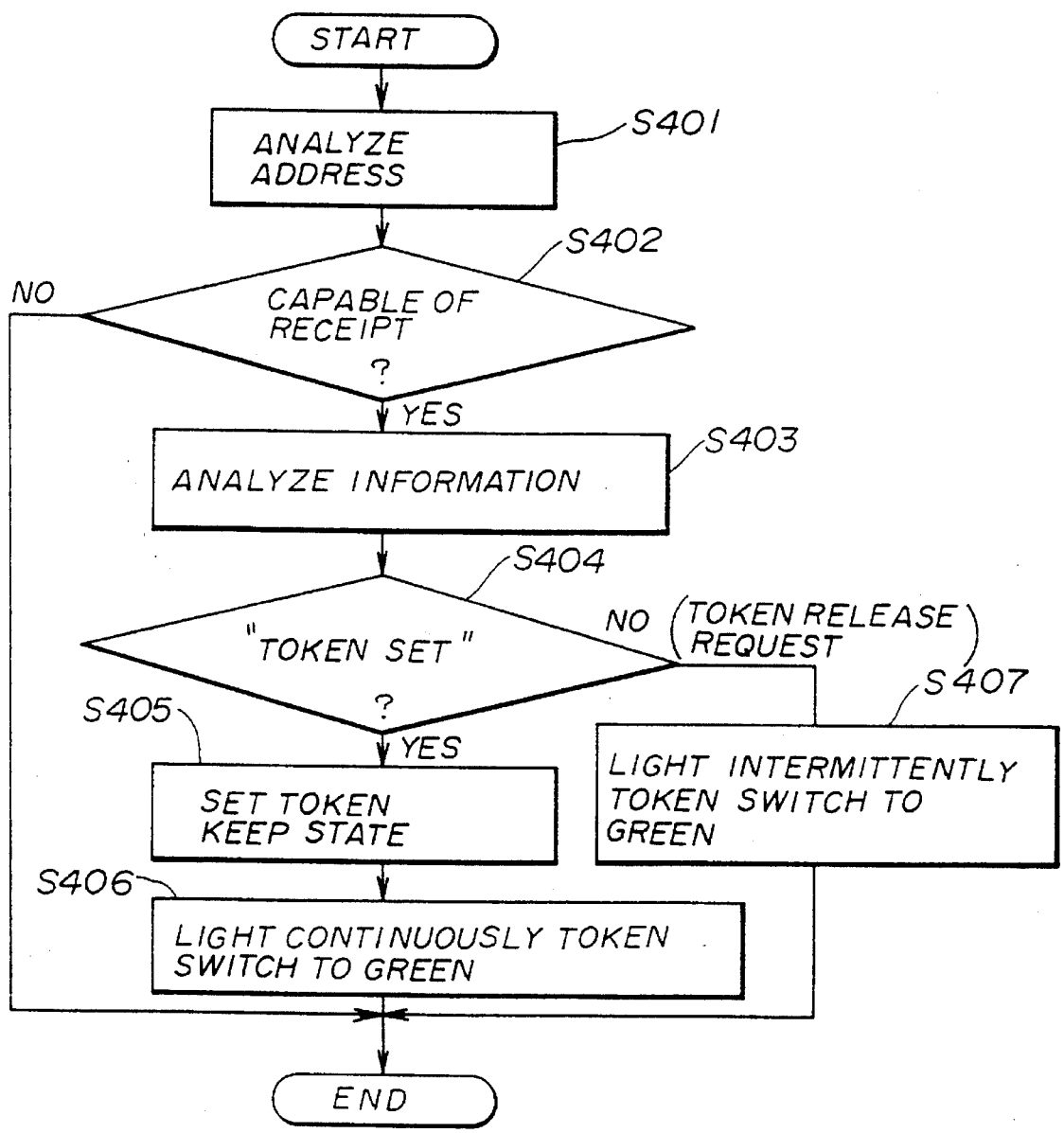
FIG. 30 shows an embodiment of a flow chart which the slave apparatus executes after when the slave apparatus receives transmission data via a signal line ST according to the embodiment of the present invention.

One example of the operation flow which each of the four slave apparatus SL1 to SL4 executes when it receives the transmission data via the signal line ST, will now be described with reference to FIG. 30.

First, the received data, in S401, that is, the destination address data D-ADD and the transmission origin address data S-ADD thereof, are analyzed so that, in S402, it is determined whether or not the slave apparatus' address has been set in the destination address D-ADD. If the result of S402 is NO, the currently received data is ignored.

If the result of S402 is YES, then, in S403, the contents of the information part IR of the received data are analyzed. Then, in S404, it is determined whether or not the first transmission word data DT of the analyzed information part IR indicates "token set".

If the result of S404 is YES, in S405, the token keep state is set as the slave apparatus' state, and then, in S406, the green light of the token switch is continuously lit so that the user may be informed that the slave apparatus' state is now in the token existing state.

Further, in a case where the first transmission word data DT of the information part IR contains a "token release request" and where the result of S404 is NO, then, in S407, the green light of the token switch is intermittently lit so as to inform the user that the token release request has been specified.

Figure 31:
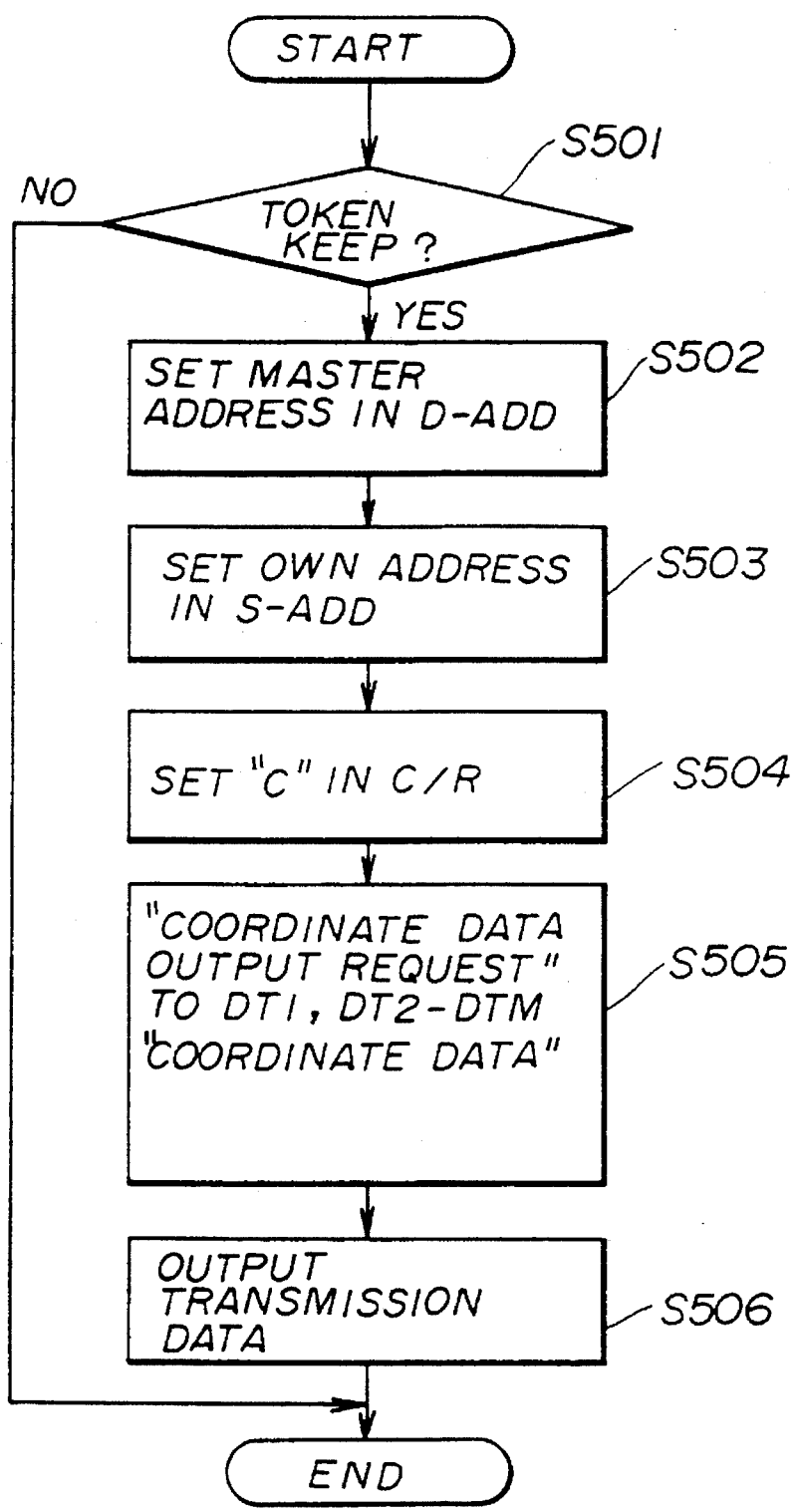
FIG. 31 shows an operation flow chart which the slave apparatus executes after a touch panel device is managed by touching the device with a touch pen according to the embodiment of the present invention.

One example of the operation flow which each of the four slave apparatus SL1 to SL4 performs when the touch panel device 12 has been managed with the touch pen 14, will now be described with reference to FIG. 31.

First, in S501, it is determined whether or not the token keep state has been set. If the result of S501 is NO, current management is ignored.

In the case where the result of S501 is YES, the data in the transmission data is set as follows: in S502, an address of the master apparatus MR is set in the destination address data D-ADD; in S503, the slave apparatus' address is set in the transmission origin address data S-ADD; in S504, data indicating "command" is set in the control information data C/R; in S505, data indicating "coordinate data output request" is set in the first transmission word data DT of the information part IR, and information (concerning the coordinate signal currently specified by the touch pen management) is set in the transmission word data DT following the above first transmission word data DT. Then, in S506, the transmission data, formed as described above, is output to the signal line ST.

Figure 32:
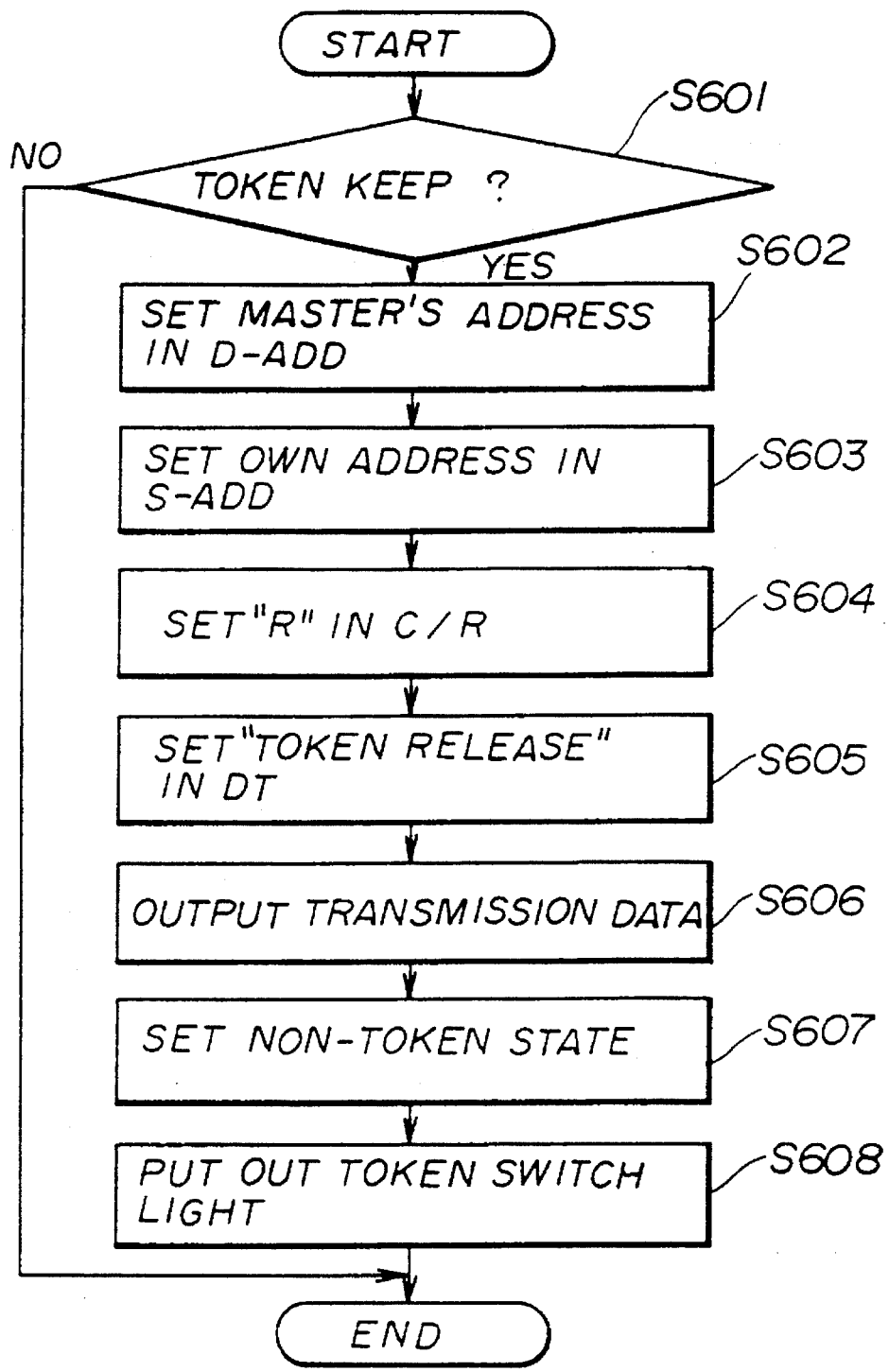
FIG. 32 shows an operation flow chart which the slave apparatus executes after when a token switch is managed according to the embodiment of the present invention.

One example of the operation flow which each of the four slave apparatus SL1 to SL4 performs when the token switch 13 has been managed, will now be described with reference to FIG. 32.

First, in S601, it is determined whether or not the token keep state has been set. If the result of the S601 is NO, current management is ignored.

If the result of S601 is YES, the data in the transmission data is set as follows: in S602, an address of the master apparatus MR is set in the destination address data D-ADD; in S603, the slave apparatus' address is set in the transmission origin address data S-ADD; in S604, data indicating "response" is set in the control information data C/R; in S605, data indicating "token release" is set in the first transmission word data DT of the information part IR. Then, in S606, the transmission data, formed as described above, is output to the signal line ST.

Then, in S607, the non-token state is set, and, in S608, the light of the token switch is put out so as to inform the user that the slave apparatus is now in the non-token state.

Thus, in the initial state during execution of the still-picture conference communication, the master apparatus MR is in the state in which the token exists and each of the four slave apparatus SL1 to SL4 is in the state in which the token does not exist.

Further, in this state, the green light integrated in the token switch 7 of the master apparatus MR is lit and the light integrated in the token switch 13 of each of the four slave apparatus SL1 to SL4 is put out. Thus, the user associated with the master apparatus MR can acknowledge the token keep state and the respective users associated with the four slave apparatus SL1 to SL4 can acknowledge the non-token states.

In this state, in the case where the user associated with the master apparatus MR, touches, as occasion demands, the touch panel device 3 using the touch pen 4 so as to manage it, the contents displayed on the LCD device 2 change in response to the above touching operation (management). Further, in response to the above touching operation, the contents displayed on the LCD devices 11, 11, 11 and 11 of the respective slave apparatus SL1, SL2, SL3 and SL4 are changed.

In the case where the user associated with the slave apparatus SL1 submits, for example, the screen management request, the user associated with the master apparatus MR may manage the token switch 7 in response to this request. Thus, the LCD device 2 displays the slave selection menu thereon so that the user of the master apparatus MR may select the above slave apparatus SL1 using the touch pen 4.

Then, the token setting data is transmitted, via the signal line ST, from the master apparatus MR to the selected slave apparatus SL1, and the master apparatus MR then is in the non-token state and the slave apparatus SL1 is in the token-existing state. Further, in this state, the red light integrated in the token switch 7 of the master apparatus MR is lit and the green light integrated in the token switch 14 of the slave apparatus SL1 is continuously lit. Thus, the user of the master apparatus MR can acknowledge the non-token state and the user of the slave apparatus SL1 can acknowledge the token-existing state.

In this state, the slave-apparatus-SL4's user's occasion-demand management (operation) (by touching the touch panel device 13 using the touch pen 14) may cause the signal concerning the coordinate data (corresponding to the position at which the slave-apparatus SL4's user has touched the touch panel 13) to be transmitted, via the signal line SR, to the master apparatus MR. The master apparatus MR then outputs the received signal concerning the coordinate data to the application being currently executed.

Thus, in this above state, such a touching operation (management) may be valid (the touching operation being executed by the slave-apparatus-SL4's user). Thus, such touching operation may alter the contents displayed on the LCD device 2 of the master apparatus MR and may alter the contents respectively displayed on the LCD devices 11, 11, 11, and 11 of the slave apparatus SL1, SL2, SL3 and SL4.

Further, in the case where the master-apparatus-MR's user hopes to terminate the slave-apparatus-SL1's user's operation, the master-apparatus-MR's user manages the token switch 7 whose red light has been lit. Thus, in response to the management executed by the token switch 7, the token release request data is transmitted from the master apparatus MR to the slave apparatus SL1. This causes the green light of the token switch 13 of the slave apparatus SL1 to be intermittently lit so the slave-apparatus-SL1's user can be informed of the occurring of the token release request.

Then, the slave-apparatus-SL1's user acknowledges the occurring of the token release request by being informed by the green light of the token switch 13 intermittently lighting as described above. Thus, the slave-apparatus-SL1's user may terminate the above touching operation and then may manage the token switch 13 so that the token release data is transmitted, via the signal line SR, from the slave apparatus SL1 to the master apparatus MR. Thus, the slave apparatus SL1 is then in the non-token state and the master apparatus MR is in the token-existing state. Further, in this condition, the green light of the master-apparatus-MR's token-switch-7's green light is lit and the slave-apparatus-SL1's light is turned off so that the master-apparatus-MR's user can acknowledge the token-existing state and the slave-apparatus-SL1's user can acknowledge the non-token state.

As mentioned above, in the embodiment of the present invention, the displaying signal VV is a signal having a maximum of 16 MHz (which is not too high a frequency) in the maximum, which signal VV is transmitted so that the contents displayed on the master-apparatus-MR's LCD-device-2 are distributed to the respective slave-apparatus-SL1, SL2, SL3 and SL4's LCD-devices-11, 11, 11, and 11. Thus, the relatively-slow data transmission means may be used as the data transmission system required for transmitting the above displaying signal VV, which relatively slow data transmission means should have a capability of only 10 Mbps. This use may reduce the cost of realizing the apparatus for distributing the picture (displayed on the master-apparatus-MR's LCD-device-2's screen) to the LCD devices 11, 11, 11 and 11 of the slave apparatus SL1, SL1, SL2 and SL4, and may provide, at a relatively low cost. This reduced cost may match the functions respectively provided by the slave apparatus SL1, SL2, SL3 and SL4.

Further, according to the embodiment of the present invention, utilizing of the LCD devices 2, 11, 11, 11, and 11 performing the picture displaying functions respectively associated with the apparatus MR, SL1, SL2, SL3, and SL4, makes it possible to miniaturize the apparatus MR, SL1, SL2, SL3, and SL4 so that only a relatively small space is sufficient for holding the still picture conference utilizing the apparatus MR, SL1, SL2, SL3, and SL4. This utilization of the above devices also results in the cost of executing the still picture conference being reduced.

Further, according to the embodiment of the present invention, the transmission/receiving (among the apparatus MR, SL1, SL2, SL3, and SL4 via the signal lines SR and ST) of the data to be used for controlling the screen(picture)-management-right (token) setting enables the slave-apparatus-SL1, SL2, SL3 and SL4's occasion-demands management to be performed on the picture displayed on the LCD screens appropriately, thus greatly improving performance of the slave apparatus SL1, SL2, SL3, and SL4, further an easy using and a user friendly using of these apparatus being able to be thus realized. Further, according to the embodiment of the present invention, a very simple construction is sufficient for realizing a function such as the transmission/receiving (among the apparatus MR, SL1, SL2, SL3, and SL4 via the signal lines SR and ST) of the data to be used for controlling the screen(picture)-management-right (token) setting. Thus, there is little difference in price between a system having the above function and a system not having the above function.

Figure 1:
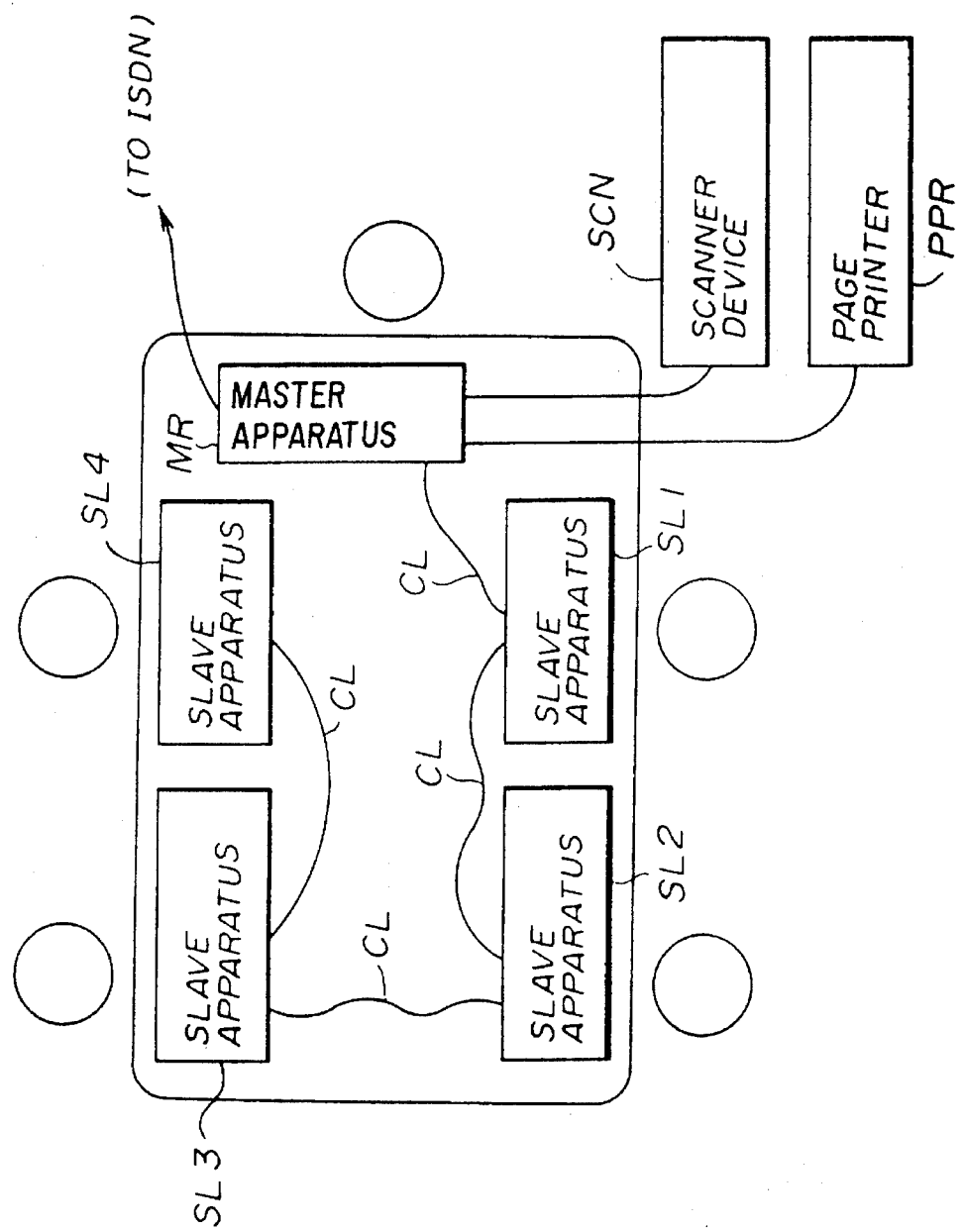
FIG. 1 shows a general diagram of a still-picture-conference system according to the embodiment of the present invention.

In the present invention, the method for connecting the apparatus MR, SL1, SL2, SL3 and SL4 is not limited to that described in regard to the embodiment of the present invention, namely, the apparatus MR, SL1, SL2, SL3, and SL4 are connected so as to form a chain (as shown in FIG. 1). Instead of being connected so as to form a chain, these apparatus may be connected to form a ring (or connected to form a loop, that is, in FIG. 1, the slave apparatus SL1 is directly connected to the master apparatus MR so that the master apparatus MR and the four slave apparatus SL1 to SL4 form a ring or a continuous loop) may be allowed.

As mentioned above, according to the present invention, the displaying data is output (transmitted) to the external apparatus so as to distribute to the external apparatus a picture associated with the displaying data, which displaying data is also sent to the LCD display control means. The above-mentioned transmission of the displaying data is executed at a data transferring speed corresponding to the relatively slow LCD-device's screen-renewal speed (or screen-renewal frequency). Thus, the transferring rate of or the frequency of clock signal to be used for transferring the displaying data to the external apparatus may be limited. This results in the cost of the system for transmitting the displaying signal being reduced. Further, according to the present invention, the screen(picture)-managing(operating) signal is transmitted from the slave apparatus to the master apparatus and then, in response to the transmitted signal the master apparatus manages (modifies) the contents displayed on the display device of the master apparatus. After this, the master apparatus transmits (distributes) the displaying data to the slave apparatus, which displaying data is also used to display a picture on the master-apparatus's display-device. This distributed-to-the-slave-apparatus and used-for-displaying-in-the-master-apparatus displaying data corresponds to those contents which have undergo the management (modification) having been executed as mentioned above. Thus, the user associated with the slave apparatus, as occasion demands, can manage (modify) the contents displayed on the display devices of the master apparatus, and the contents displayed on the display devices of the slave apparatus, the slave apparatus including the slave apparatus having undergone the user's management (modification).

Further, the present invention is not limited to the above described embodiments, and variations and modifications may be made without departing from the scope of the present invention.

What is claimed is:

1. A control system for picture-display apparatus comprises a first picture-display apparatus comprising:

a first display device having a screen for displaying pictures on said screen so that said screen is refreshed at first frequent predetermined screen refreshing intervals;

a first display-device control means for outputting the displaying data to said first display device at said first frequent predetermined screen refreshing intervals;

storing means for storing the displaying data;

a displaying-data control means for reading the displaying data stored in said storing means at first frequent predetermined screen renewal intervals, said displaying-data control means then outputting the read displaying data to said first display-device control means, wherein each of said first frequent predetermined screen refreshing intervals is shorter than each of said first frequent predetermined screen renewal intervals;

wherein display-data control means further converts displaying data read from the storing means into a serial form of the displaying data and outputs it to at least one second picture-display apparatus at second frequent predetermined screen renewal intervals, wherein each of said first frequent predetermined screen refreshing intervals is shorter than each of said second frequent predetermined screen renewal intervals;

wherein a display-data control means of said second picture-display apparatus inputs said serial form of the displaying data and converts it into parallel form of the displaying data which is then supplied to a second display device of said second picture-display apparatus at second frequency predetermined screen refreshing intervals which correspond to said second display device;

wherein said first picture-display apparatus further comprises communication means for communicating with said second picture-display apparatus; and wherein said first picture-display apparatus uses an electric cable for transmitting the serial form of the displaying data to said at least one second picture-display apparatus so as to distribute the pictures currently displayed on said screen of said first display device to said at least one second picture-display apparatus.

2. The control system for the picture-display apparatus according to claim 1, wherein said first display device comprises a liquid crystal display device.

3. The control system for the picture-display apparatus according to claim 1, wherein said displaying-data control means forms a transfer clock signal and display timing signal, said displaying-data control means transferring the displaying data, to both said first display-device control means and said second picture-display apparatus, together with said display timing signal, which transmission is performed in response to said transfer clock signal, and said display timing signal being used for determining borders included in the displaying data so as to use said displaying data appropriately to represent pictures both on said first display device and with said second picture-display apparatus.

4. The control system for the picture-display apparatus according to claim 1, wherein said second picture-display apparatus comprises:

a second display device having a screen for displaying pictures on said screen so that said screen is refreshed at frequent predetermined screen refreshing intervals; and a second display-device control means for outputting the displaying data to said first display device at said frequent predetermined screen refreshing intervals.

5. The control system for the picture-display apparatus according to claim 1, wherein a screen resolution rate of said first display device is substantially identical to that of said second display device.

6. The control system for the picture-display apparatus according to claim 1, wherein:

a plurality of said second picture-display apparatus are provided;

said first picture-display apparatus transmits the displaying data to an apparatus from among the plurality of said second picture-display apparatus, said apparatus from among said plurality of said second picture-display apparatus using said received displaying data to display corresponding pictures; and said apparatus from among the plurality of said second picture-display apparatus transmits said received displaying data to another apparatus from among said plurality of said second picture-display apparatus, said other apparatus of said plurality of said second picture-display apparatus using said received displaying data to display corresponding pictures.

7. The control system for the picture-display apparatus according to claim 6, wherein said apparatus from among said plurality of said second picture-display apparatus has a second display device, said other apparatus from among said plurality of second picture-display apparatus has a third display device, a screen resolution rate of said third display device being identical to that of said second display device, and said screen resolution rate of said second display device being identical to that of said first display device.

8. The control system for the picture-display apparatus according to claim 1, wherein said second picture-display apparatus comprises a picture management means for managing a picture displayed by said second picture-display apparatus, said picture management means outputting, to said first picture-display apparatus, a picture management signal in response to the management performed on a picture displayed by said second picture-display apparatus, said first picture-display apparatus renewing, in response to the received picture management signal, the displaying data stored in said storing means.

9. The control system for the picture-display apparatus according to claim 8, wherein a plurality of said second picture-display apparatus are provided, said first picture-display apparatus selecting an apparatus from among the plurality of said second picture-display apparatus, only a picture displayed by said selected apparatus being manageable, said selected apparatus then outputting the picture management signal to said first picture-display apparatus, said first picture-display apparatus then renewing contents stored in said storing means according to said received picture management signal.

10. The control system for the picture-display apparatus according to claim 9, wherein said first picture-display apparatus requests the picture management to be performed on an apparatus from among said plurality of said second picture-display apparatus, said apparatus from among said plurality of said second picture-display apparatus then terminating the outputting of the picture managing signal to said first picture-display apparatus.

11. The control system for the picture-display apparatus according to claim 1, wherein a distance between said terminal apparatus and said first picture-display apparatus is significantly larger than a distance between said first picture-display apparatus and said at least one second picture-display apparatus.

12. The control system for the picture-display apparatus according to claim 8, wherein:
   a plurality of said second picture display apparatus are provided;
   a token is set to one apparatus of said plurality of said second picture-display apparatus; and
   only a picture displayed by only one of said plurality of said second picture-display apparatus is manageable, said one apparatus of said plurality of said second picture-display apparatus then outputting the picture management signal to said first picture-display apparatus, said first picture-display apparatus then renewing contents stored in said storing means according to said picture management signal.

13. The control system for the picture-display apparatus according to claim 1, further comprising at least one third picture-display apparatus connected in serial to the at least one second picture-display apparatus for receiving the display data currently displayed on said screen of said first display device through the at least one second picture-display apparatus.

* * * * *